United States Patent
Heo et al.

(10) Patent No.: US 11,416,080 B2
(45) Date of Patent: Aug. 16, 2022

(54) USER INTENTION-BASED GESTURE RECOGNITION METHOD AND APPARATUS

(71) Applicant: Samsung Electronics Co., Ltd., Suwon-si (KR)

(72) Inventors: Changryong Heo, Suwon-si (KR); Kihuk Lee, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/250,813

(22) PCT Filed: Sep. 5, 2019

(86) PCT No.: PCT/KR2019/011442
§ 371 (c)(1),
(2) Date: Mar. 5, 2021

(87) PCT Pub. No.: WO2020/050636
PCT Pub. Date: Mar. 12, 2020

(65) Prior Publication Data
US 2021/0191526 A1    Jun. 24, 2021

(30) Foreign Application Priority Data
Sep. 7, 2018   (KR) .................. 10-2018-0107348

(51) Int. Cl.
*G06F 3/01*     (2006.01)
*G06V 40/20*    (2022.01)
(52) U.S. Cl.
CPC .............. *G06F 3/017* (2013.01); *G06V 40/20* (2022.01)

(58) Field of Classification Search
CPC . G06F 3/017; G06F 3/01; G06F 3/012; G06F 3/0304; G06F 3/0482;
(Continued)

(56) References Cited

U.S. PATENT DOCUMENTS 9,894,260 B2    2/2018  Liu et al.
10,120,526 B2 * 11/2018  Han .................... G06F 3/04815
(Continued)

FOREIGN PATENT DOCUMENTS

JP   2017-211960 A   11/2017
JP   2018-109874 A    7/2018
(Continued)

OTHER PUBLICATIONS

International Search Report and Written Opinion of the International Searching Authority in connections to International Application PCT/KR2019/011442 dated Dec. 24, 2019, 9 pages.

*Primary Examiner* — Grant Sitta

(57) ABSTRACT

The present document relates to a user intention-based gesture recognition method and apparatus, and an electronic device comprises one or more sensors, a memory, and a processor, wherein the processor can be configured to check a distance between the electronic device and the user by using the one or more sensors, detect a user gesture by operating in a first gesture mode on the basis of the checked distance satisfying a designated range by using the one or more sensors, detect the user gesture by operating in a second gesture mode on the basis of the checked distance deviating from the designated range, and perform an operation corresponding to a valid gesture on the basis of the detected gesture being a valid gesture. Other various embodiments are possible.

12 Claims, 18 Drawing Sheets

(58) Field of Classification Search
CPC . G06F 3/04842; G06F 3/011; G06K 9/00335; G06K 9/00; G06K 9/6267; G06V 40/20; G06V 10/44; G06V 40/172; G06V 40/28
See application file for complete search history.

(56) References Cited

U.S. PATENT DOCUMENTS

| | | | |
|---|---|---|---|
| 10,515,117 B2* | 12/2019 | Storer | G11B 27/11 |
| 11,189,319 B2* | 11/2021 | Witt | H04N 21/23418 |
| 2004/0199292 A1* | 10/2004 | Sakagami | G05D 1/0274 |
| | | | 700/259 |
| 2008/0030460 A1* | 2/2008 | Hildreth | G06F 3/017 |
| | | | 345/156 |
| 2009/0197615 A1* | 8/2009 | Kim | H04W 52/027 |
| | | | 455/456.1 |
| 2012/0268373 A1* | 10/2012 | Grzesiak | G06F 3/017 |
| | | | 345/158 |
| 2012/0316680 A1* | 12/2012 | Olivier, III | G05D 1/0246 |
| | | | 700/258 |
| 2013/0222246 A1* | 8/2013 | Booms | G06F 3/0346 |
| | | | 345/156 |
| 2013/0241821 A1* | 9/2013 | Hiyama | G06V 40/113 |
| | | | 345/156 |
| 2013/0321826 A1* | 12/2013 | Chen | G01S 13/56 |
| | | | 356/623 |
| 2014/0037139 A1 | 2/2014 | Lee et al. | |
| 2014/0062862 A1* | 3/2014 | Yamashita | G06V 40/174 |
| | | | 382/103 |
| 2014/0168062 A1* | 6/2014 | Katz | G06F 3/0484 |
| | | | 345/156 |
| 2014/0173524 A1* | 6/2014 | Schwesinger | G06F 3/04812 |
| | | | 715/856 |
| 2014/0285461 A1* | 9/2014 | Campbell | G06F 3/017 |
| | | | 345/173 |
| 2014/0340524 A1* | 11/2014 | Holz | G06V 10/25 |
| | | | 348/169 |
| 2014/0365979 A1 | 12/2014 | Yoon et al. | |
| 2015/0277570 A1* | 10/2015 | Kauffmann | G06F 3/0484 |
| | | | 345/156 |
| 2015/0331492 A1 | 11/2015 | Woo et al. | |
| 2017/0277942 A1* | 9/2017 | Lerner | G06V 40/28 |
| 2018/0011543 A1* | 1/2018 | Funami | G06F 3/04812 |
| 2018/0059925 A1 | 3/2018 | Maizels et al. | |
| 2018/0095524 A1 | 4/2018 | Chew | |
| 2018/0188817 A1 | 7/2018 | Iio et al. | |
| 2020/0012350 A1* | 1/2020 | Tay | G06F 3/012 |

FOREIGN PATENT DOCUMENTS

| | | |
|---|---|---|
| KR | 10-2014-0017829 A | 2/2014 |
| KR | 10-2014-0144412 A | 12/2014 |
| KR | 10-2015-0130808 A | 11/2015 |

\* cited by examiner

USER INTENTION-BASED GESTURE RECOGNITION METHOD AND APPARATUS

CROSS-REFERENCE TO RELATED APPLICATIONS

This application is a 371 National Stage of International Application No. PCT/KR2019/011442, filed Sep. 5, 2019, which claims priority to Korean Patent Application No. 10-2018-0107348, filed Sep. 7, 2018, the disclosures of which are herein incorporated by reference in their entirety.

BACKGROUND

1. Field

Various embodiments disclosed herein relate to a method and an apparatus for user intention-based gesture recognition, and more particularly, to a method and an apparatus for user intention-based gesture recognition, which can recognize a valid gesture of a user.

2. Description of Related Art

An input device (for example, a keyboard or a mouse) may be used to input a command to an electronic device, or the electronic device may recognize the user's gesture and then manipulate a user interface.

As a method for recognizing the user's gesture and manipulating the user interface accordingly, the user may carry or wear a device including a motion sensor such that a gesture is recognized, or an image acquired by a camera included in the electronic device may be analyzed to recognize a user gesture.

SUMMARY

If all gestures performed by the user are recognized as commands by the electronic device, there is a possibility that a gesture unrelated to the user's intention will also be recognized as a command, and an operation unintended by the user may be performed as a result.

In the case of a method in which the electronic device preconfigures a reference point and recognizes only a user gesture occurring within a predetermined range around the reference point as a command, the electronic device may have difficulty in recognizing gesture if the user has no recognition of specific reference points. If a specific area or object is fixed as a reference point, it is impossible to dynamically change the gesture recognition area according to a change in the user's location or the situation related to the user's body and surroundings.

An electronic device according to various embodiments disclosed herein may include: one or more sensors; a memory; and a processor. The processor may be configured to: check a distance between the electronic device and a user using the one or more sensors, detect a gesture of the user by operating in a first gesture mode based on the checked distance satisfying a designated range, using the one or more sensors, and detect a gesture of the user by operating in a second gesture mode based on the checked distance deviating from the designated range, and perform an operation corresponding to a valid gesture based on the detected gesture being recognized as the valid gesture.

A method of operating an electronic device according to various embodiments disclosed herein may include the operations of: checking a distance between the electronic device and a user using one or more sensors; detecting a gesture of the user by operating in a first gesture mode based on the checked distance satisfying a designated range using the one or more sensors, and detecting a gesture of the user by operating in a second gesture mode based on the checked distance deviating from the designated range; and performing an operation corresponding to a valid gesture based on the detected gesture being recognized as the valid gesture.

An electronic device according to various embodiments of the disclosure may determine whether or not a gesture is valid based on the area in which the gesture is sensed or the characteristics of the sensed gesture, thereby recognizing only a gesture intended by the user as a command.

An electronic device according to various embodiments of the disclosure may configure a gesture sensing area based on the distance between the user and the electronic device and the user's characteristics, thereby configuring a gesture sensing area appropriate to each other.

An electronic device according to various embodiments of the disclosure may continuously learn the user's intention and thus configure a gesture sensing area appropriate to the user.

DETAILED DESCRIPTION

Figure 1:
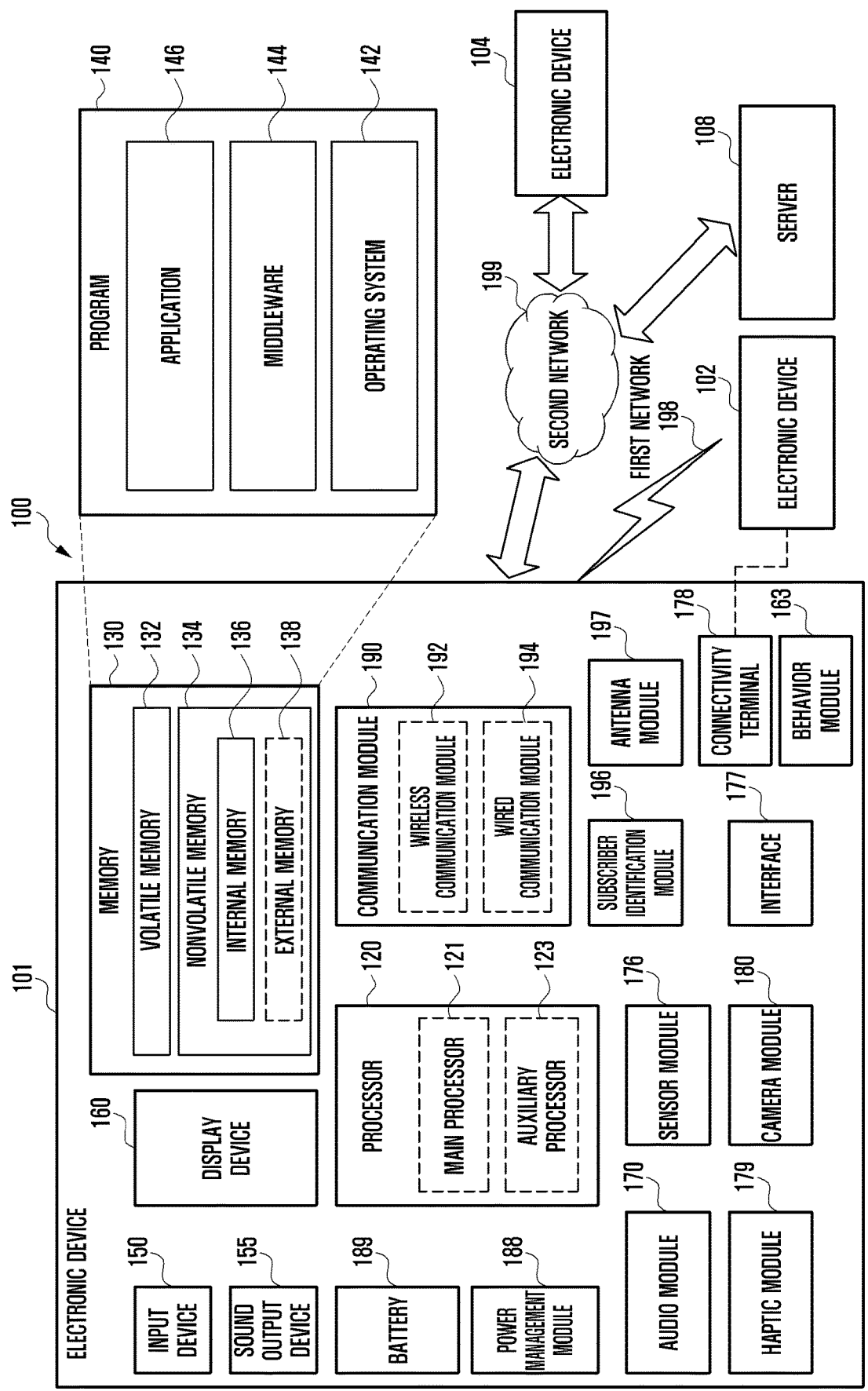
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an action module 163, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The action module 163 may express a change in facial expression, may express a change in posture, or may perform traveling. According to an embodiment, the action module 163 may include a facial expression motor, a posture expression motor, or a driving unit. The facial expression motor may visually provide a state of the electronic device 101 through the display device 160, for example. The driving unit may be used to move the electronic device 101 and to mechanically change another element, for example. The driving unit may be configured to be able to rotate in the upward/downward/leftward/rightward direction or in the clockwise/counterclockwise direction around at least one axis, for example. The driving unit may be implemented by combining driving motors (for example, wheel-type wheels, sphere-type wheels, continuous tracks, or propellers), or implemented by independently controlling the same.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. According to an embodiment, the camera module 180 may include a 2D camera 182 or an infrared-based depth camera 184.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module, according to an embodiment, may be formed as a conductive material or a conductive pattern, and according to some embodiments, may further include other components (eg, RFIC) in addition to the a conductive material or a conductive pattern. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
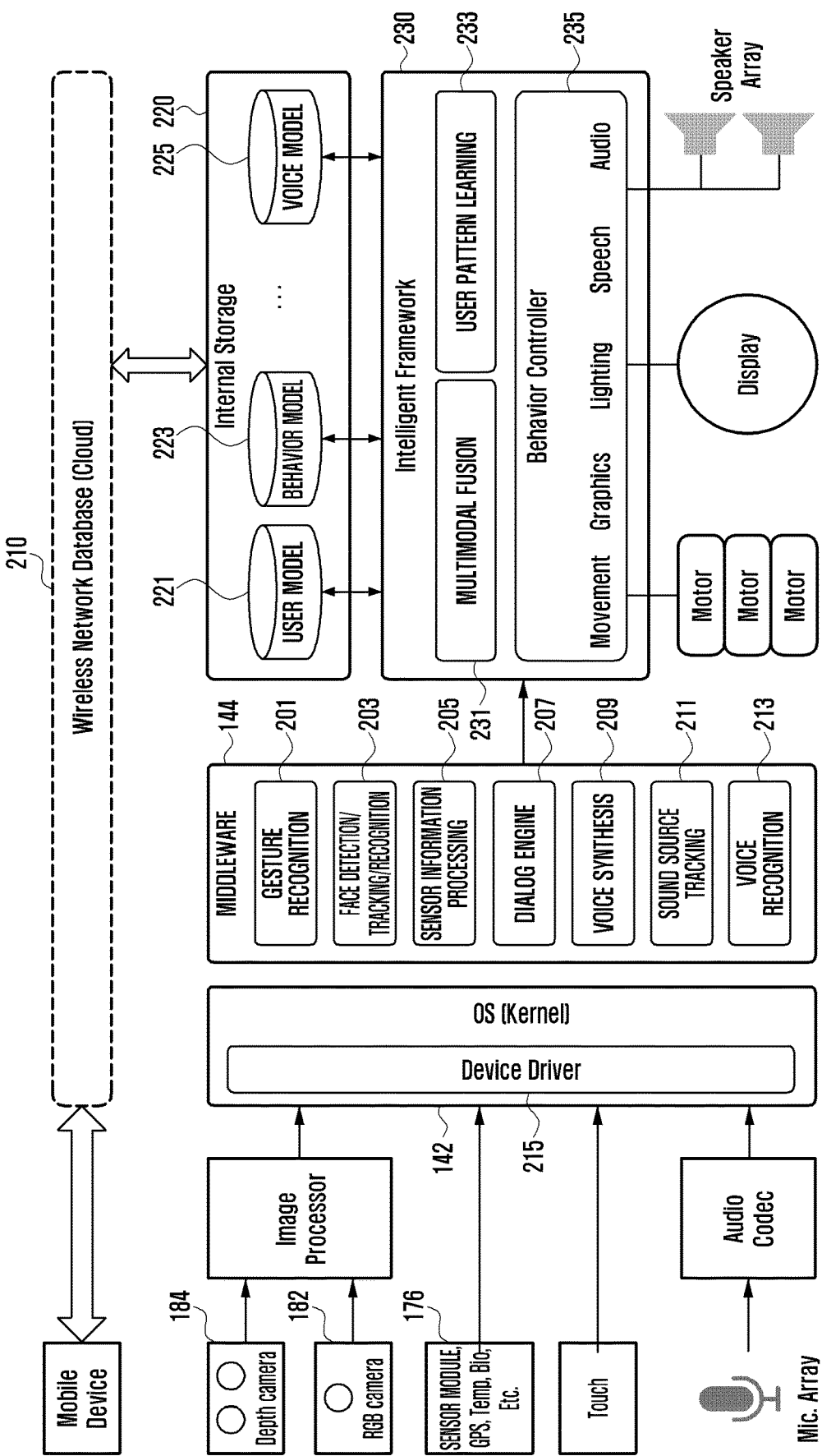
FIG. 2 is a software block diagram according to various embodiments of the disclosure.

FIG. 2 is a software block diagram according to various embodiments of the disclosure.

Referring to FIG. 2, software of an electronic device may include an operating system (OS) for controlling one or more resources of the electronic device, middleware, an intelligent framework, or an internal storage. The operating system may include, for example, Android™, iOS™, Windows™, Symbian™, Tizen™, or Bada™. At least some of software programs may be preloaded on an electronic device at the time of manufacture, may be downloaded from an external electronic device (e.g., the electronic device 102 or 103) or server 108 when used by a user, or may be updated.

The operating system may control management (e.g., allocation or retrieval) of one or more system resources (e.g., process, memory, or power) of the electronic device. The operating system 142 may include additionally or alternatively other hardware devices of the electronic device 101, for example, one or more driver programs for operating an input device 150, a sound output device 155, a display device 160, an action module 163, an audio module 170, a sensor module 176, an interface 177, a haptic module 179, a camera module 180, a power management module 188, a battery 189, a communication module 190, a subscriber identification module 196, or an antenna module 197.

The middleware may detect and track the location of a user's face using signal-processed data, or may perform authentication through face recognition. The middleware may perform a role of recognizing a user's 3D gesture, tracking an input location (direct of arrival, DOA) for an audio signal, recognizing voice, and processing signals of various sensor data. The middleware may include, for example, a gesture recognition manager, a face detection/tracking/recognition manager, a sensor information processing manager, a conversation engine manager, a speech synthesis manager, a sound source tracking manager, or a voice recognition manager.

The intelligent framework may include, for example, a multimodal fusion block, a user pattern learning block, or a behavior control block (behavior controller). The multimodal fusion block may play a role of collecting and managing various types of information processed by, for example, the middleware. The user pattern learning block may extract and learn meaningful information, such as a user's life pattern and preference, using, for example, the information of the multimodal fusion block. The behavior control block may express, for example, information to be fed back to the user by the electronic device as motion, graphic (UI/UX), light, voice response, or sound.

The internal storage may include, for example, a user model DB, a behavior model DB, or a voice model DB. The user model DB may store, for example, information learned by the intelligent framework for each user. The behavior model DB may store, for example, information for behavior control of the electronic device. The information stored in each DB may be stored or shared in, for example, a wireless network DB (e.g., a cloud).

Figure 3:
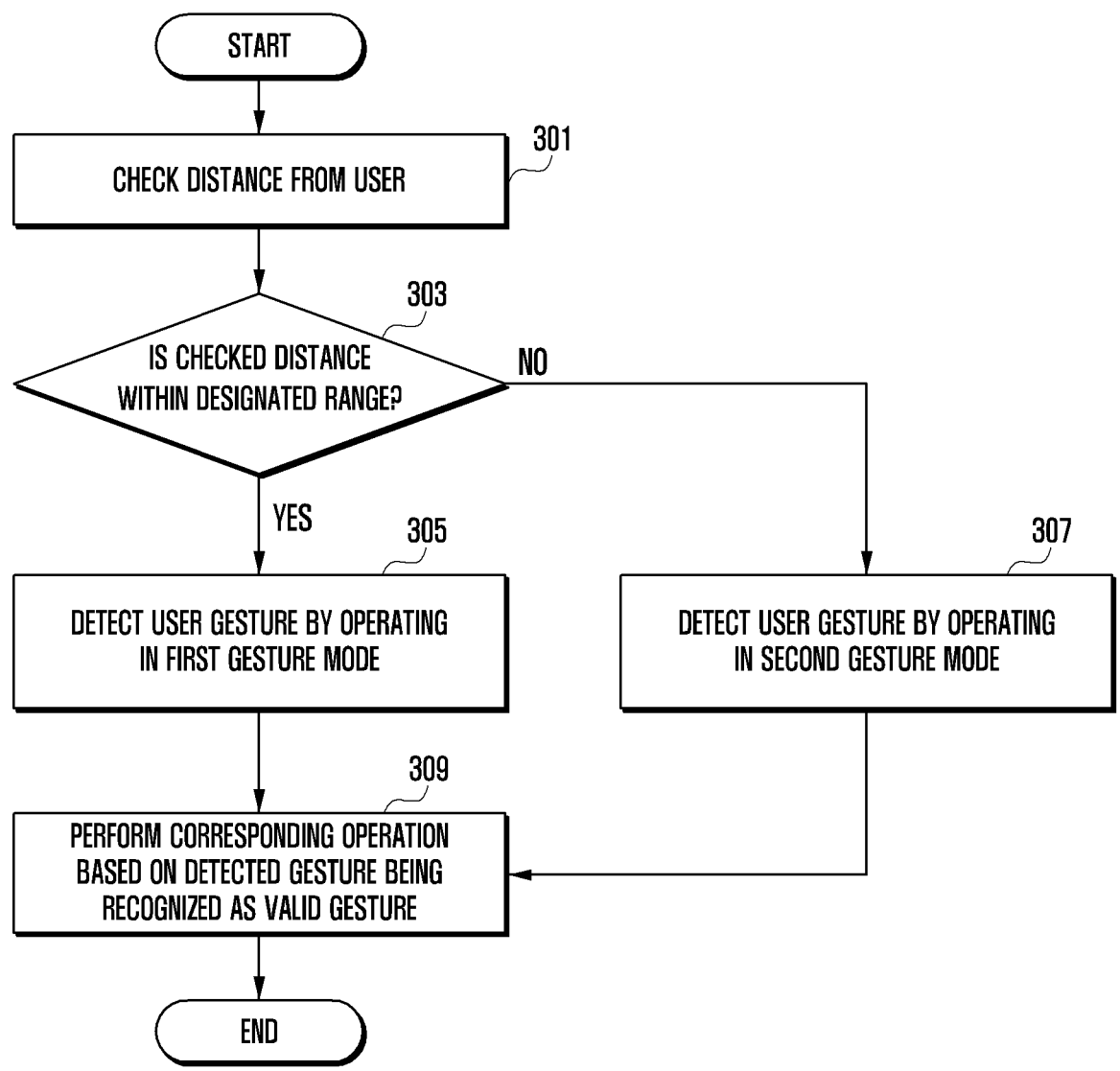
FIG. 3 is an operation flowchart illustrating a method of determining a gesture recognition mode according to a distance between an electronic device and a user according to various embodiments of the disclosure.

FIG. 3 is an operation flowchart illustrating a method of determining a gesture recognition mode according to a distance between an electronic device and a user according to various embodiments of the disclosure.

According to various embodiments, in operation 301, a processor may check a distance between the electronic device 101 and a user using one or more sensors.

The one or more sensors according to various embodiments may include a gesture sensor, a gyro sensor, an acceleration sensor, a grip sensor, a proximity sensor, a color sensor, an infrared (IR) sensor, a biometric sensor, a 3D depth sensor, a microphone, a camera sensor, an ultrasonic sensor, or a radio frequency sensor. The sensing value of the sensor may be provided to the processor, and the processor may check the location of an object (e.g., the user) and a distance from the object, for example, using the sensing value of the sensor. The processor may detect, for example, a user's gesture using the one or more sensors.

The camera sensor may be at least one of a dual camera, a 360-degree camera, a 2D image capture camera 182, or an infrared-based depth camera. The camera sensor may be, for example, a vision camera. The 3D depth sensor may be an infrared-based depth camera. The 3D depth sensor may be a depth camera 184. The 3D depth sensor and the camera sensor may be the camera module 180. According to various embodiments, the processor may perform face recognition of the user using, for example, the camera sensor.

The 3D depth sensor may be composed of, for example, an IR emitter and a depth image CMOS, and may measure a distance between the electronic device 101 and an object by using a time difference in which an IR signal transmitted through the IR emitter is reflected by the object and returned.

In operation 303, the processor may determine whether a distance from the user identified in operation 301 is within or out of an identified range.

When the identified distance from the user is within the designated range, the processor may proceed to operation 305, and may control the electronic device 101 to operate in a first gesture mode, and the electronic device 101 may detect a user's gesture through the one or more sensors under the first gesture mode.

When the identified distance is out of the designated range, the processor may proceed to operation 307 and may control the electronic device 101 to operate in a second gesture mode, and the electronic device 101 may detect a user's gesture through the one or more sensors under the second gesture mode.

The processor may change the gesture mode based on the distance between the electronic device 101 and the user. The processor may operate in the first gesture mode when it is determined that the user is located within the designated range, and may operate in the second gesture mode when it is determined that the user is located out of the designated range. The processor may operate by dividing the user's gesture into the first gesture mode performed at a short distance or the second gesture mode performed at a long distance.

When the processor operates in a first gesture mode 420 performed, for example, in a short distance, the user may be able to perform a directly input on the electronic device 101 such as a touch, so that the processor may operate in a 2D gesture mode.

When the processor operates in a second gesture mode 430 performed, for example, in a long distance, the user may be located in an area where a touch is not possible, so that the processor may operate in a 3D gesture mode.

The designated range for determining the gesture mode may be a value preset in the electronic device 101, or may be adaptively determined in consideration of the user's physical characteristics.

According to various embodiments, the processor may detect the user's gesture using the one or more sensors. The one or more sensors may include, for example, a 2D image capture camera sensor or an infrared-based depth camera. The electronic device 101 may detect the user's gesture in a gesture area.

According to various embodiments, the electronic device 101 may store a gesture recognition algorithm in a memory. The electronic device 101 may process the user's gesture detected in the gesture area according to the gesture recognition algorithm.

The gesture area may refer to, for example, an entire area where the user's gesture can be detected.

The processor may check the skeleton of the user to recognize the movement of the joint, etc., thereby using the corresponding gesture as an input command. For example, the processor may detect a motion of a user performing a pointing operation by hand, a motion of moving a hand forward/backward/left/right, and a motion of drawing a triangle or a circle by hand.

In operation 307, the processor may perform a designated operation corresponding to a valid gesture based on the detected gesture being recognized as the valid gesture. When the detected gesture is recognized as the valid gesture, the processor may proceed to operation 309 to perform the designated operation corresponding to the valid gesture, or when the detected gesture is recognized as an invalid gesture, the processor may not perform a designated operation corresponding to the invalid gesture.

Figure 4:
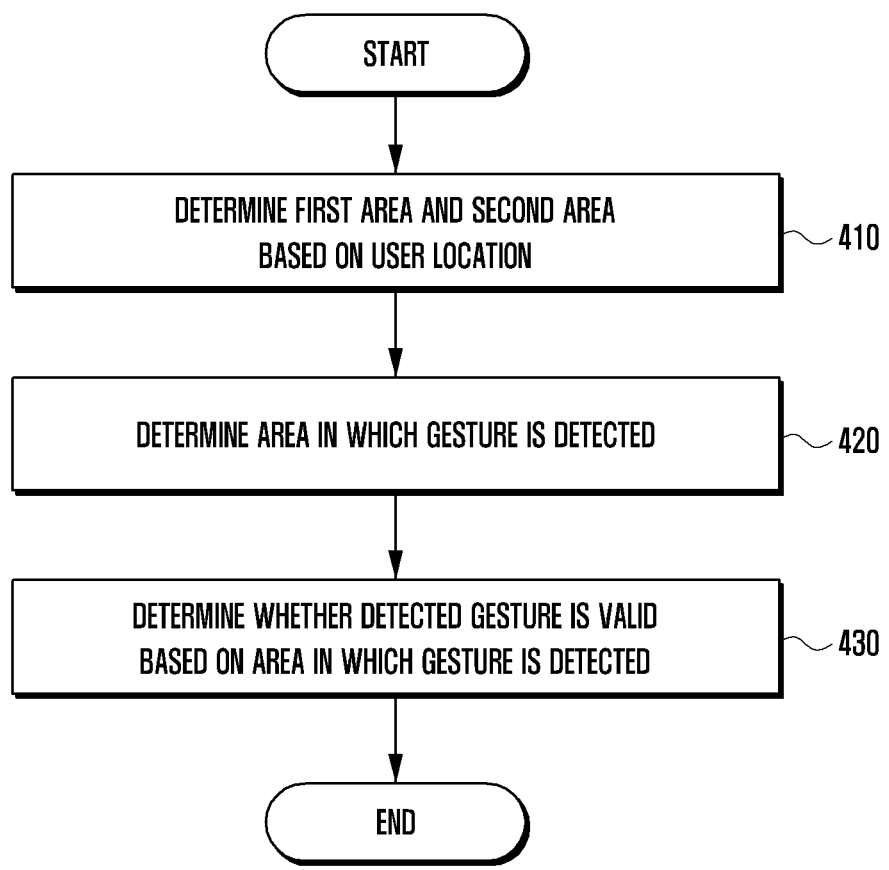
FIG. 4 is an operation flowchart illustrating a method of recognizing a valid gesture by an electronic device according to various embodiments of the disclosure.

FIG. 4 is an operation flowchart illustrating a method of recognizing a valid gesture by an electronic device according to various embodiments of the disclosure.

Referring to FIG. 4, an operation specifically flowcharting a case in which the processor operates in the second gesture mode to detect a user's gesture in operation 307 of FIG. 3 is illustrated.

In operation 410, the processor may determine a first area and a second area based on a user's location. The processor may detect the user's location using one or more sensors. According to various embodiments, the processor may divide the gesture area into the first area and the second area.

The processor may configure, for example, the user's location as a user's central axis. An area including a peripheral space within a first distance $R_1$ designated from the user's central axis may be determined as the first area, and an area including a peripheral space within a second distance $R_2$ designated larger than the designated first distance $R_1$ while excluding the first area may be determined as the second area. The gesture area may refer to the entire area, for example, within the second distance $R_2$, and the gesture area may be divided into the first area and the second area.

In operation 420, the processor may detect a gesture and may determine an area in which the gesture is detected. The processor may determine, for example, whether the gesture is detected in the first area or in the second area.

In operation 430, the processor may determine whether the detected gesture is valid based on the area in which the gesture is detected. The processor may designate one of the first area and the second area to recognize only the gesture detected in the designated area as a valid gesture. The electronic device 101 may recognize, for example, a gesture detected in the first area as an invalid gesture and a gesture detected in the second area as a valid gesture.

When the detected gesture is recognized as a valid gesture, the processor may perform an operation corresponding to the detected gesture. When the detected gesture is recognized as an invalid gesture, the processor may not perform an operation corresponding to the detected gesture.

The processor may proceed to operation 309 of FIG. 3 after operation 430, and may perform a corresponding operation based on whether the gesture is valid. According to various embodiments, the processor may recognize, for example, a gesture generated in the first area as an invalid gesture, and may recognize only the gesture generated in the second area as a valid gesture, thereby performing a corresponding operation.

Figure 5:
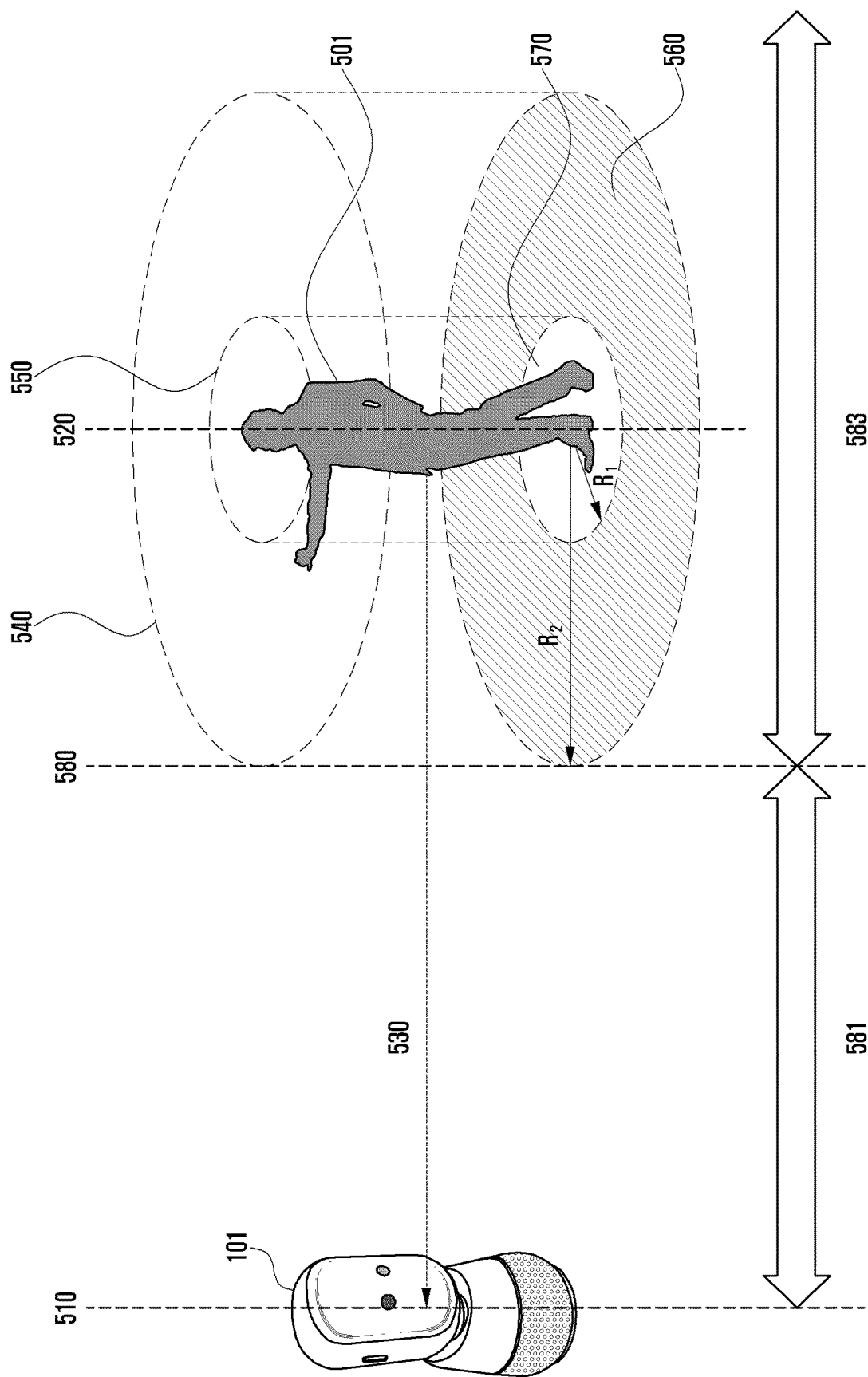
FIG. 5 is a diagram illustrating a gesture recognition situation between an electronic device and a user according to various embodiments of the disclosure.

FIG. 5 is a diagram illustrating a gesture recognition situation between the electronic device 101 and a user according to various embodiments of the disclosure.

Referring to FIG. 5, the electronic device 101 may detect a user's gesture and may perform a command based on the detected gesture. The electronic device 101 may change a gesture detection mode according to a distance from the user. For example, when it is determined that a user is located within a designated range, the electronic device 101 may operate in a first gesture mode to detect the user's gesture, and when it is determined that the user is located outside the designated range, the electronic device 101 may operate in a second gesture mode to detect the user's gesture.

The electronic device 101 may determine a first area and a second area based on, for example, a distance from a user's central axis 520, and may determine whether the detected gesture is valid based on the determined gesture area.

The electronic device 101 may check a user's location using at least one sensor. The processor may determine the first area and the second area based on the user's location. The processor may configure the user's location as the user's central axis 520, and in this case, an area including a peripheral space within a first distance $R_1$ from the user's central axis 520 may be determined as a first area 570, and an area including a peripheral space within a second distance $R_2$ larger than the designated first distance $R_1$ while excluding the first area 570 may be determined as a second area 560. The $R_1$ and $R_2$ may be values previously stored in the electronic device 101, or may be determined based on the user's characteristics (e.g., the user's height, the length of the user's body structure (e.g., arm), etc.) recognized by the electronic device 101.

The processor may determine whether the detected gesture is valid according to an area in which the gesture is detected. In a case in which only the gesture detected in the second area is recognized as a valid gesture by the processor, for example, when the user's gesture is detected in the first area 570, the corresponding gesture may be recognized as an invalid gesture, and when the user's gesture is detected in the second area 560, the corresponding gesture may be recognized as a valid gesture.

When the detected gesture is recognized as a valid gesture by the processor, the processor may perform an operation corresponding to the detected gesture. When the detected gesture is recognized as an invalid gesture by the processor, the processor may not perform an operation corresponding to the detected gesture.

In this case, $R_1$ may be defined as, for example, a radius of an area in which an invalid gesture is generated among the user's gestures, and $R_2$ may be defined as a maximum range radius in which a user can execute a gesture. An area in which the detected gesture is recognized as a valid gesture among the gesture areas may be a space between a first boundary 550 having $R_1$ as a radius and a second boundary 540 having $R_2$ as a radius. In this case, the gesture area may refer to the entire area within the maximum radius range $R_2$ in which the user can execute a gesture, and the gesture area may be divided into a first area and a second area. For better understanding, the first area 570 and the second area 560 are expressed in circular and cylindrical shapes, but the first area 570 and the second area 560 may be determined to have various shapes such as a sphere, an ellipse, and a semicircle. For example, when the first area 570 and the second area 560 are determined in a spherical shape, a central point (e.g., the user's head) instead of the user's central axis 520 may be configured and determined.

The processor may operate by dividing the user's gesture into a first gesture mode performed at a short distance 581 or a second gesture mode performed at a long distance 583. When the processor operates in the first gesture mode performed at, for example, the short distance 581, the user can perform a direct input on the electronic device 101, such as a touch, so that the processor may operate in a touch mode or a 2D gesture mode. When the processor operates in, for example, the second gesture mode performed at the long distance 583, the user may be located in an area where a touch is not possible, so that the processor may operate in a 3D gesture mode. Such a gesture mode may be changed depending on whether the user is located within a designated range from the electronic device. The designated range for determining the gesture mode may be determined to be a preset value or may be adaptively determined in consideration of the user's physical characteristics.

The electronic device 101 may check a distance D 530 between the electronic device 101 and the user using the at least one sensor. The distance 530 between the electronic device 101 and the user may refer to a linear distance from the central axis 510 of the electronic device 101 to the central axis 520 of the user. The electronic device 101 may determine the first area and the second area based on the user's location. According to various embodiments, the processor may configure the $R_2$ as a radius of a maximum range in which the user executes a gesture and the $R_1$ as a radius of an area in which an invalid gesture is generated among various gestures of the user, thereby determining the gesture area.

According to various embodiments, the electronic device may user-adaptively determine a designated range, which is a reference for determining the gesture mode, based on the second distance $R_2$ that is the radius of the second area. When the distance D 530 between the electronic device 101 and the user is shorter than the maximum range radius $R_2$ ($D \leq R_2$) (When the user is located within the range 581), the processor may operate in the first gesture mode. When the processor operates in the first gesture mode, for example, only a touch input of the user may be received, or a 2D gesture area may be determined and a corresponding gesture may be recognized as a gesture having specific validity for each 2D gesture area. When the distance D between the electronic device 101 and the user is larger than the maximum range radius $R_2$ ($D > R_2$) (When the user is located within the range 583), the processor may operate in the second gesture mode. When the processor operates in the second gesture mode, for example, a 3D gesture area may be determined and whether the gesture detected for each 3D gesture area is valid. In this case, a conversion point for distinguishing the first gesture mode and the second gesture mode may be defined as ($D-R_2$).

Figure 6:
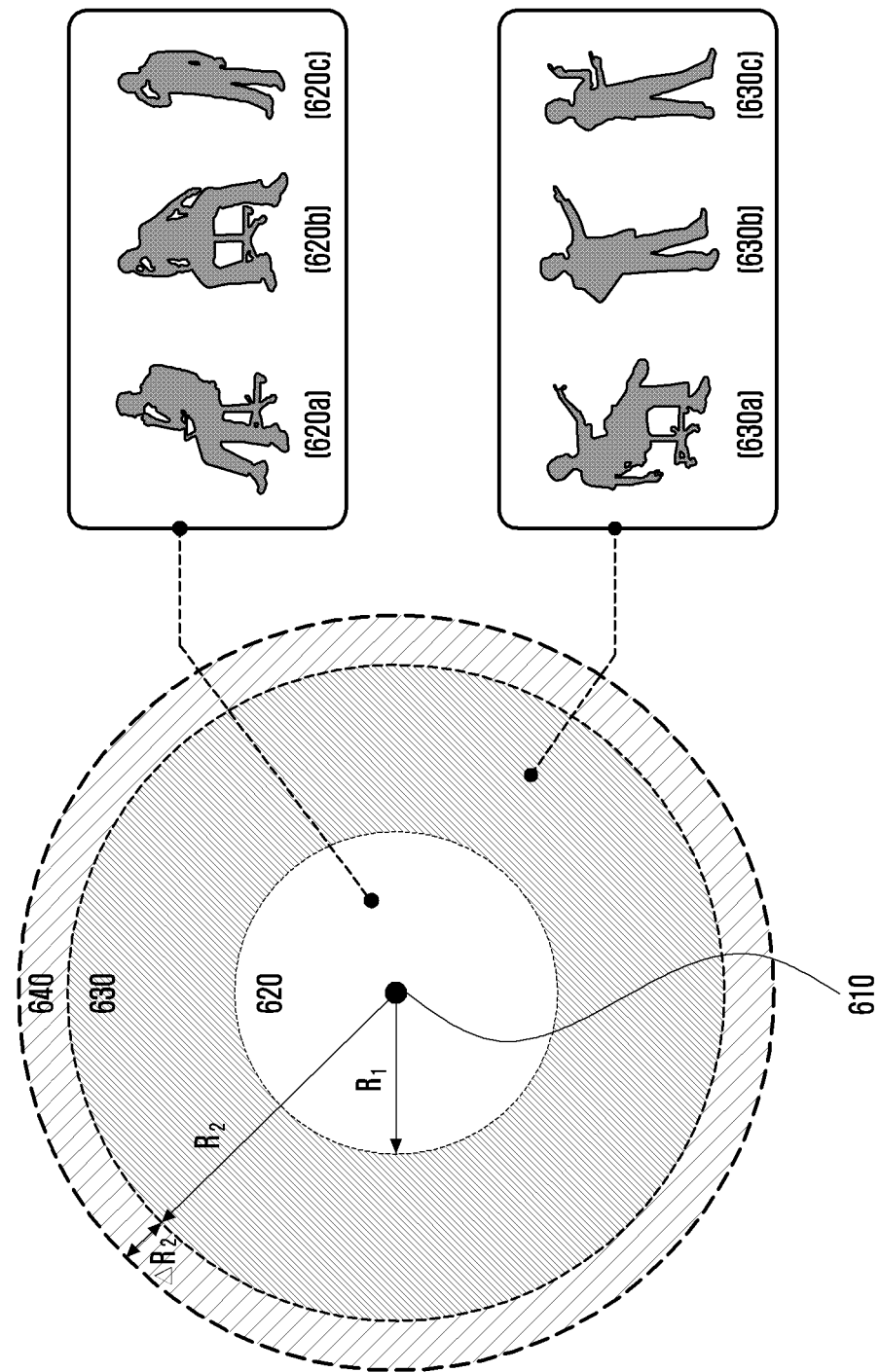
FIG. 6 is a schematic diagram illustrating a gesture area determined by an electronic device according to various embodiments of the disclosure.

FIG. 6 is a schematic diagram illustrating a gesture area determined by an electronic device according to various embodiments of the disclosure.

Referring to FIG. 6, a user's gesture generated in a first area 620 including a peripheral space within a first distance $R_1$ from a reference point by using a user's location as a reference point 610 may be recognized as an invalid gesture by a processor. According to various embodiments, gestures such as a gesture 620a of a user supporting his chin by hand, a gesture 620b of a user scratching his head, a gesture 620c of a user thinking while placing his finger on his head, and the like which are generated in the first area 620 are only natural movements that occur on a daily basis and should not be determined as valid gestures intended to control the electronic device. For example, in the case of a gesture generated within the first area 620, the processor may determine and filter the corresponding gesture as an invalid gesture.

A user's gesture generated in the second area 630 including a peripheral space within the second distance $R_2$ and not including the first area 620 may be recognized as a valid gesture by the processor. According to various embodiments, gestures such as a gesture 630a of a user performing a pointing operation with his arm, a gesture 630b of a user performing a handing-over operation with his hand, a gesture 630c of a user performing control using his/her two hands, and the like which are intended to control the electronic device, and thus should be determined as valid gesture commands. For example, in the case of a gesture generated in the second area 630, the processor may determine the corresponding gesture as a valid gesture and may perform an operation corresponding thereto.

According to various embodiments, the processor may change the second distance $R_2$ according to the state of the user. When the processor recognizes that the user is holding an additional object (e.g., baton, etc.) by hand, the processor may expand $R_2$ to $R_2 + \Delta R_2$ in consideration of a corresponding length $\Delta R_2$ and may expend the second area 630 up to a hatched area 640.

Figure 7:
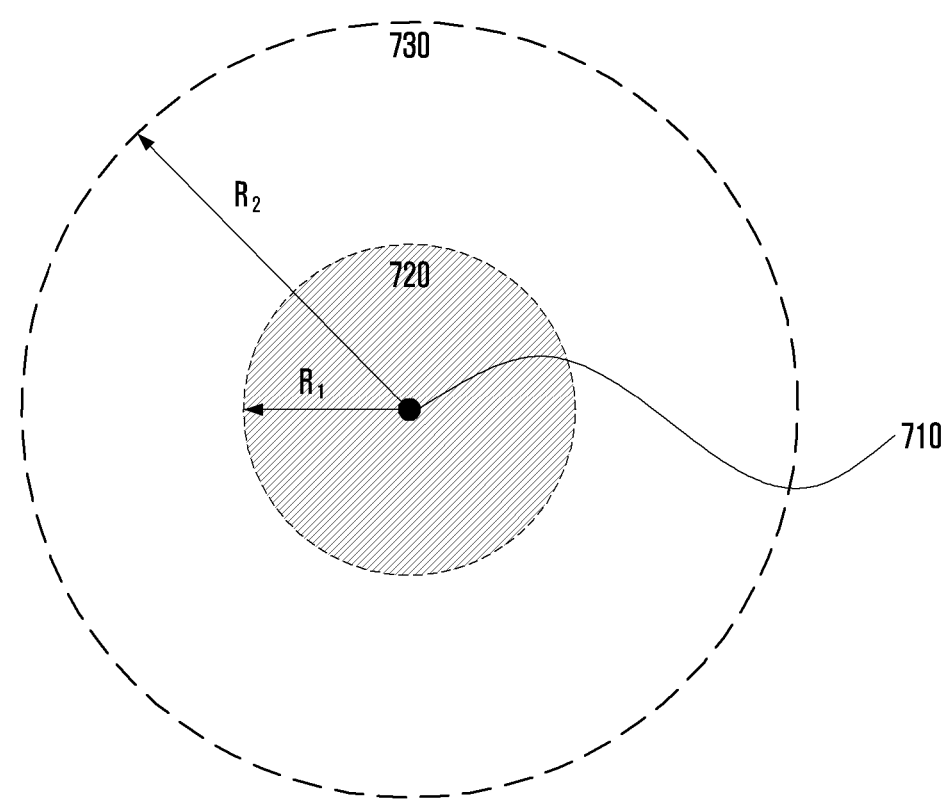
FIG. 7 is a schematic diagram illustrating a gesture area determined by an electronic device according to various embodiments of the disclosure.

FIG. 7 is a schematic diagram illustrating a gesture area determined by an electronic device according to various embodiments of the disclosure.

Referring to FIG. 7, unlike the above description, the first area and the second area may be swapped. The processor according to various embodiments may recognize, for example, a gesture recognized in a first area 720 including a peripheral space within a first distance $R_1$ from a reference point 710 as a valid gesture, and may recognize a gesture recognized in a second area 730 including a peripheral space within a second distance $R_2$ and not including the first area 720 may be recognized as an invalid gesture. The processor may configure, for example, a user's location checked using one or more sensors as the reference point 710. The reference point 710 may be, for example, a user's central axis or a part of the user's body (e.g., the user's head). According to various embodiments, the processor may configure an external object (e.g., a sofa) as the reference point. The processor may determine, for example, the gesture area based on the external object.

In this case, the processor may perform an operation by recognizing, for example, a gesture detected in the first area 720 as a valid gesture, and may recognize a gesture detected in the second area 730 as an invalid gesture.

Figure 8A:
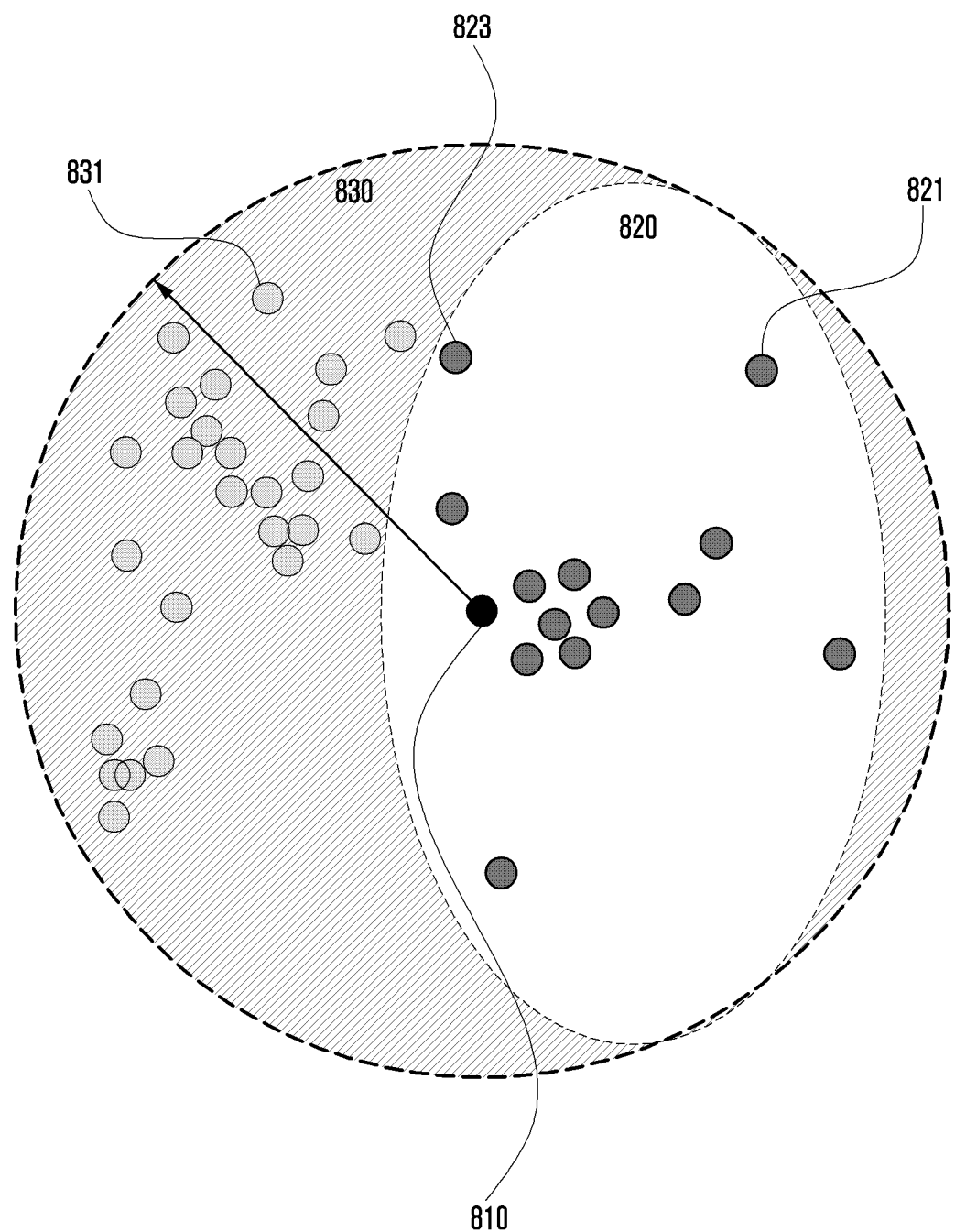
FIG. 8A is a schematic diagram illustrating a process of determining a gesture area suitable for a user according to various embodiments of the disclosure.
Figure 8B:
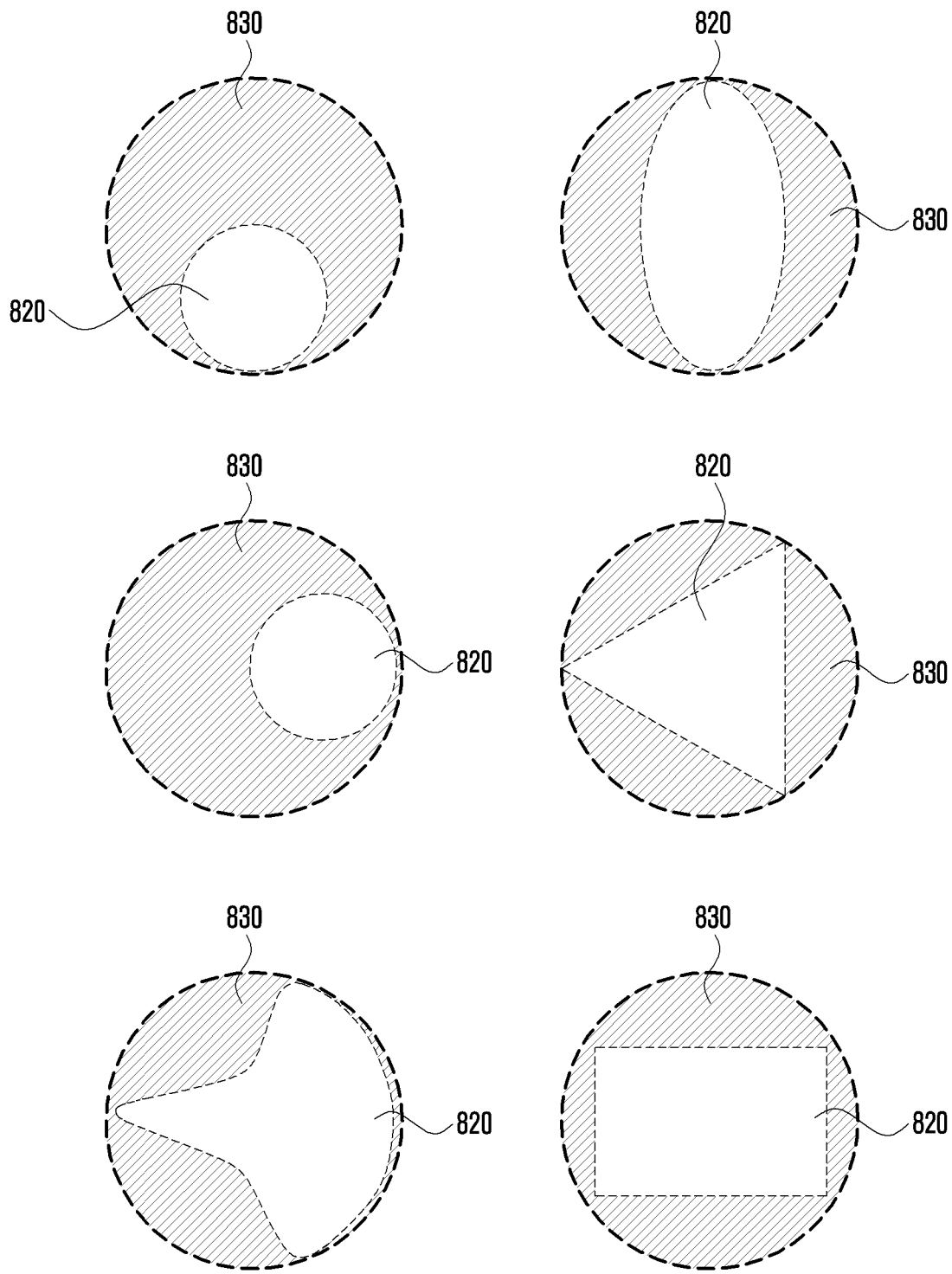
FIG. 8B is a diagram illustrating a gesture area appropriately determined for each user according to various embodiments of the disclosure.

FIG. 8A is a schematic diagram illustrating a process of determining a valid gesture area from a reference point 810 (e.g., a user) according to various embodiments of the disclosure, and FIG. 8B is a diagram illustrating a gesture area learned for each user according to various embodiments of the disclosure.

Referring to FIGS. 8A and 8B, the processor may determine a first area and a second area by learning a gesture generation pattern that a user continuously performs. The electronic device may also perform a machine learning process to determine a gesture area for each user. The processor may perform an operation of confirming the user's intention for all gestures detected by the user within the entire gesture area. The processor may receive, for example, a user input to determine whether all gestures are gestures intended by the user or unrelated to the intention of the user. The processor may change a first area 820 in which a gesture detected based on the received user input is recognized as an invalid gesture and a second area 830 in which the detected gesture is recognized as a valid gesture. Accordingly, the size and shape of the first area 820 and the second area 830 may be determined differently for each user. For example, when detecting a gesture 821 and a gesture 823, the processor may determine whether the gesture 821 and the gesture 823 are intended gestures. When the electronic device receives, from the user, a user input confirming that the gesture 821 and the gesture 823 are gestures unrelated to the intention of the user, the processor may change the first area and the second area so that places where the gesture 821 and the gesture 823 are generated are included in the first area. For example, when detecting the gesture 831, the processor may check whether the gesture 831 is an intended gesture. When the electronic device receives a user input confirming that the gesture 831 is a gesture intended by the user, from the user through an input device, the processor may change the first area and the second area so that a place where the gesture 831 is generated is included in the second area.

According to various embodiment, the processor may determine an area within a maximum range radius $R_2$ in which the user can execute a gesture, as the entire gesture area, and may check the user's intention for all user gestures detected within the entire gesture area. The processor may receive a user input confirming the user's intention. The processor may learn a user's gesture generation pattern based on the user input, and may determine the first area 820 and the second area 830 based on the user's gesture generation pattern.

According to various embodiments, the processor may determine the first area 820 and the second area 830 according to a designated distance based on the user's location, and may then check the user's intention for the user gestures detected in the first area 820 and the second area 830. In this case, the processor may learn the user's gesture pattern, and may change the first area 820 and the second area 830 based on the learned user's gesture pattern to determine the same again.

Referring to FIG. 8B, the processor may variously determine the sizes and shapes of the first area 820 and the second area 830 within the gesture area for each user.

Figure 9:
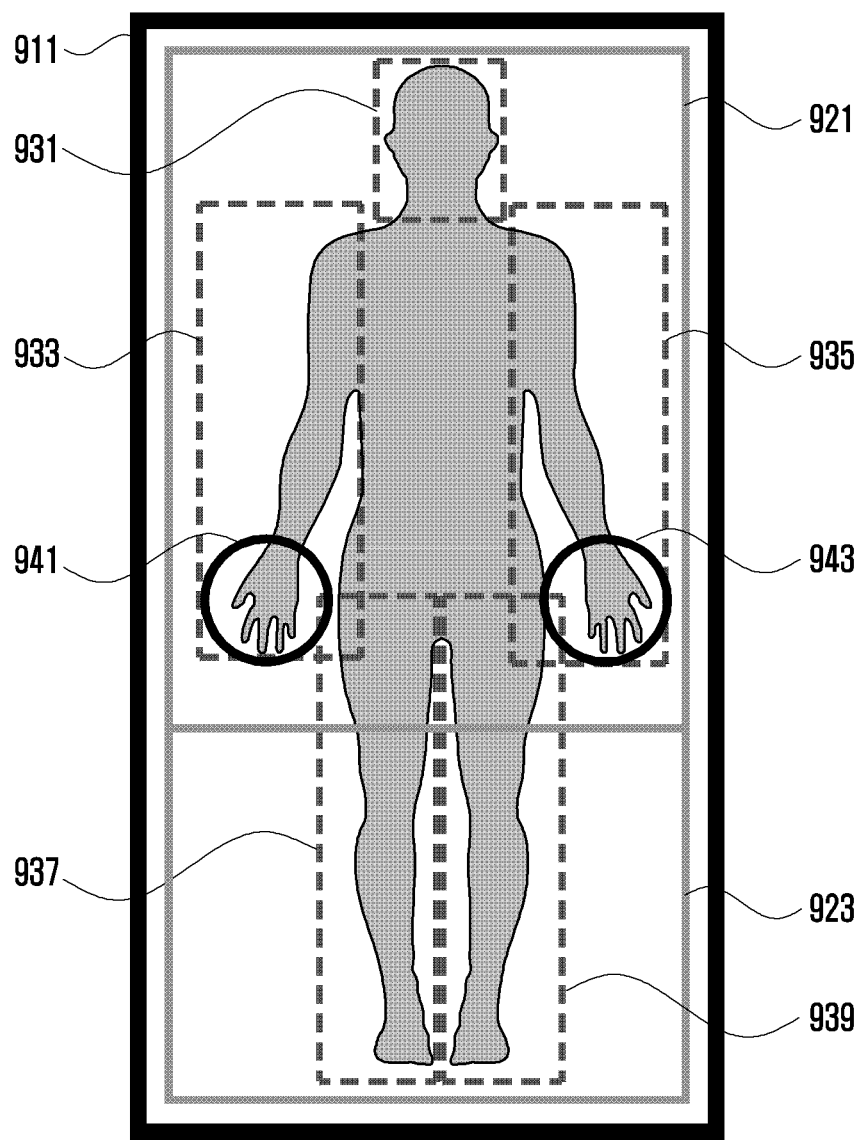
FIG. 9 is a diagram illustrating a gesture area determined according to a physical characteristic of a user according to various embodiments of the disclosure.

FIG. 9 is a diagram illustrating a gesture area determined according to a physical characteristic of a user according to various embodiments of the disclosure.

Referring to FIG. 9, the processor may recognize user's physical characteristics (e.g., height, length of a body structure, age, presence or absence of a physical disability, etc.) and may apply a gesture area suitable for the user's physical characteristics. The user's physical characteristics may be directly input by the user to the electronic device or may be determined by the processor based on recognized information. The processor may configure, for example, the location and size of the gesture area. For example, the processor may configure the gesture area as the whole body 911, as an upper body 921 or a lower body 923 only, as a head 931, arms 933 and 935 or legs 937 and 939 only, or as two hands 941 and 943 only. In this case, the location and size of the gesture recognition area may be configured differently even within one application.

Figure 10:
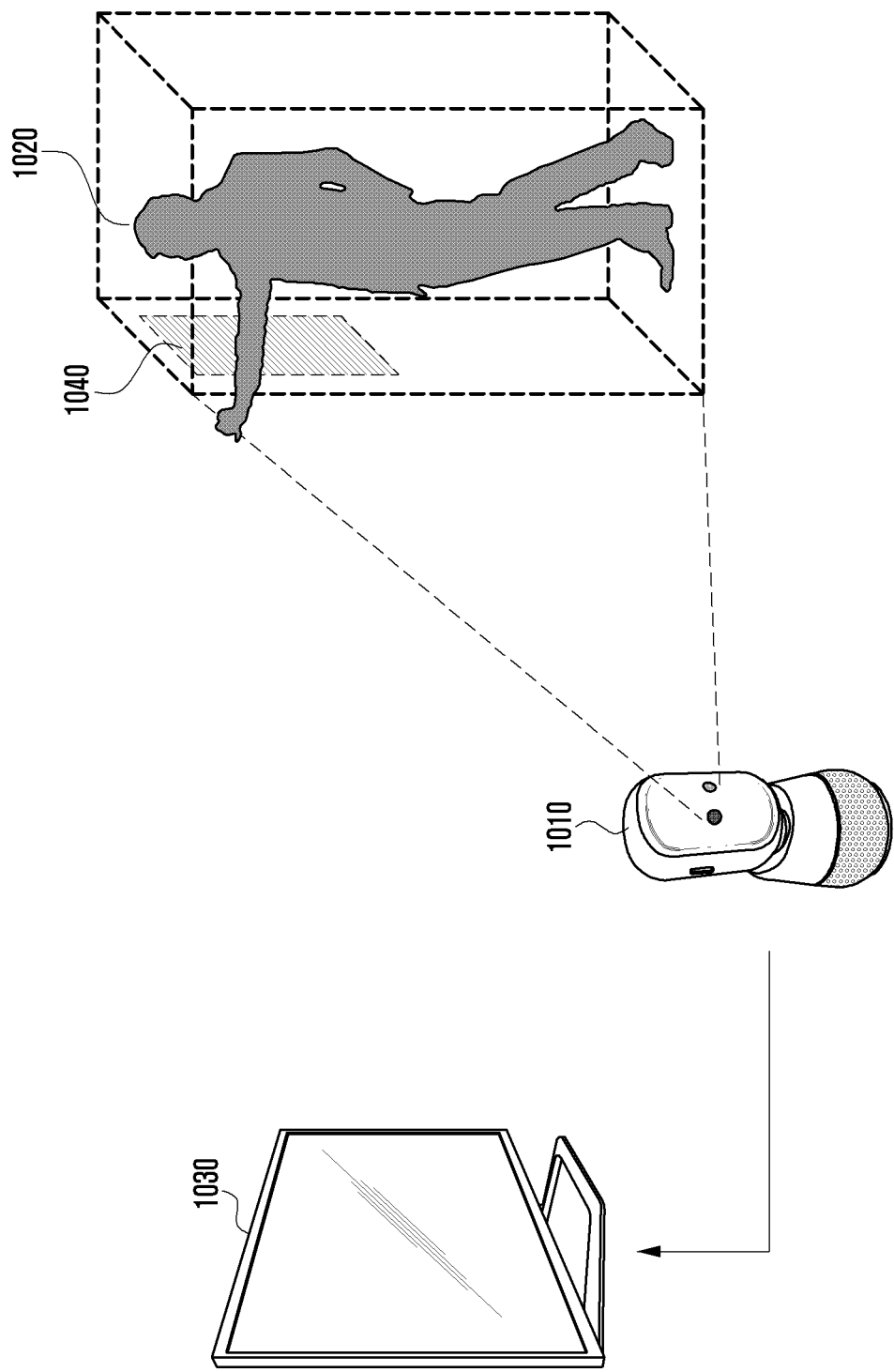
FIG. 10 is a diagram illustrating operations among an electronic device, a user, and an external device according to various embodiments of the disclosure.

FIG. 10 is a diagram illustrating operations among an electronic device, a user, and an external device according to various embodiments of the disclosure.

Referring to FIG. 10, a user 1020 may control an external device 1030 located nearby through an electronic device 1010. The electronic device 1010 may be paired with, for example, the external device 1030 located nearby, and may transmit a specific command to the external device 1030 by recognizing a gesture of the user 1020. The electronic device 1010 may check a field of view of the user 1020, and may select the external device 1030 located within the field of view as a target to which the command is to be transmitted. The electronic device 1010 may determine a gesture area 1040 based on the location and/or body characteristics of the user 1020.

Figure 11:
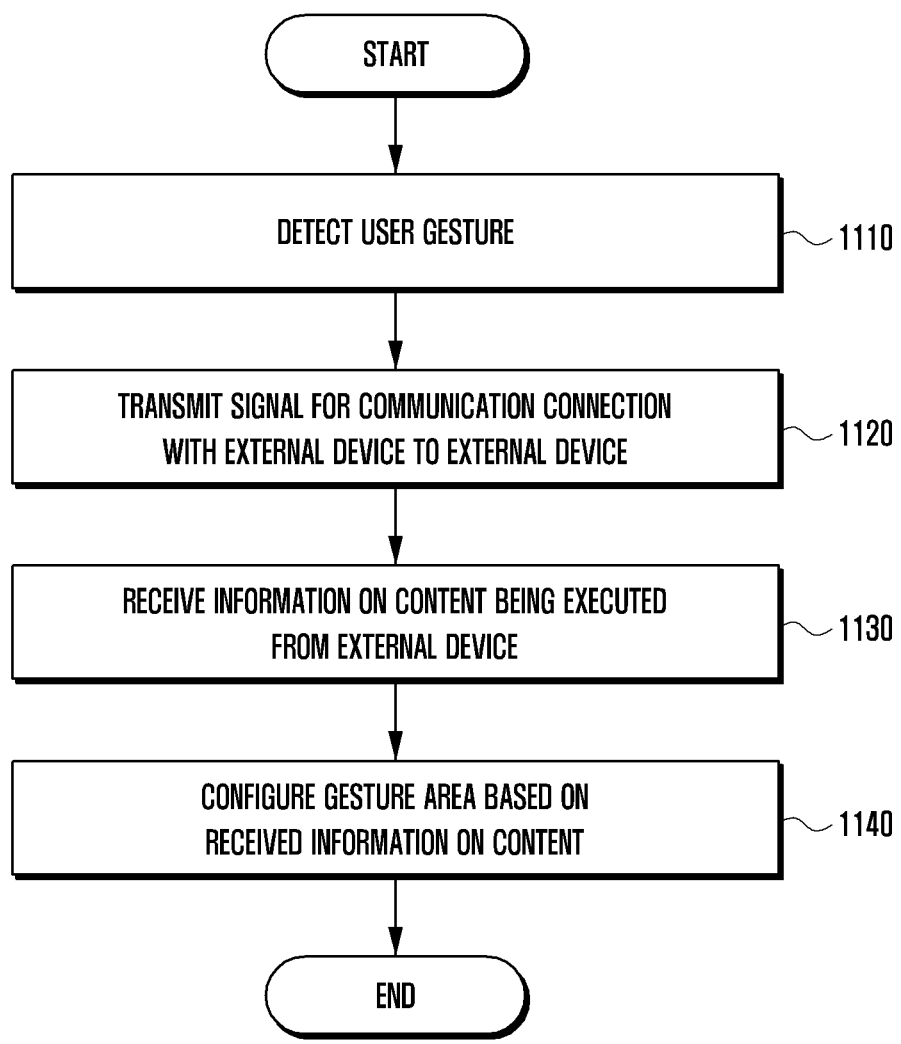
FIG. 11 is a flowchart illustrating a method of operating an electronic device according to an external device according to various embodiments of the disclosure.

FIG. 11 is a flowchart illustrating a method of operating an electronic device according to various embodiments of the disclosure.

Referring to FIG. 11, in operation 1110, the processor may detect a user's gesture for controlling an external device through at least one sensor. The processor may detect, for example, the user's gesture controlling the external device.

In operation 1120, the processor may transmit a signal for communication connection with the external device to the external device through a communication circuit. In this case, the electronic device may be communicatively connected with the external device.

In operation 1130, the processor may receive information on content being executed from the external device. The content may include, for example, a menu mode for displaying a menu, a play mode for playing a game, etc., a setting mode for user setting, or an advertisement mode for displaying advertisements.

In operation 1140, the processor may configure the gesture area based on the received content information. The processor may differently determine an area for detecting a gesture for each content.

Figure 12:
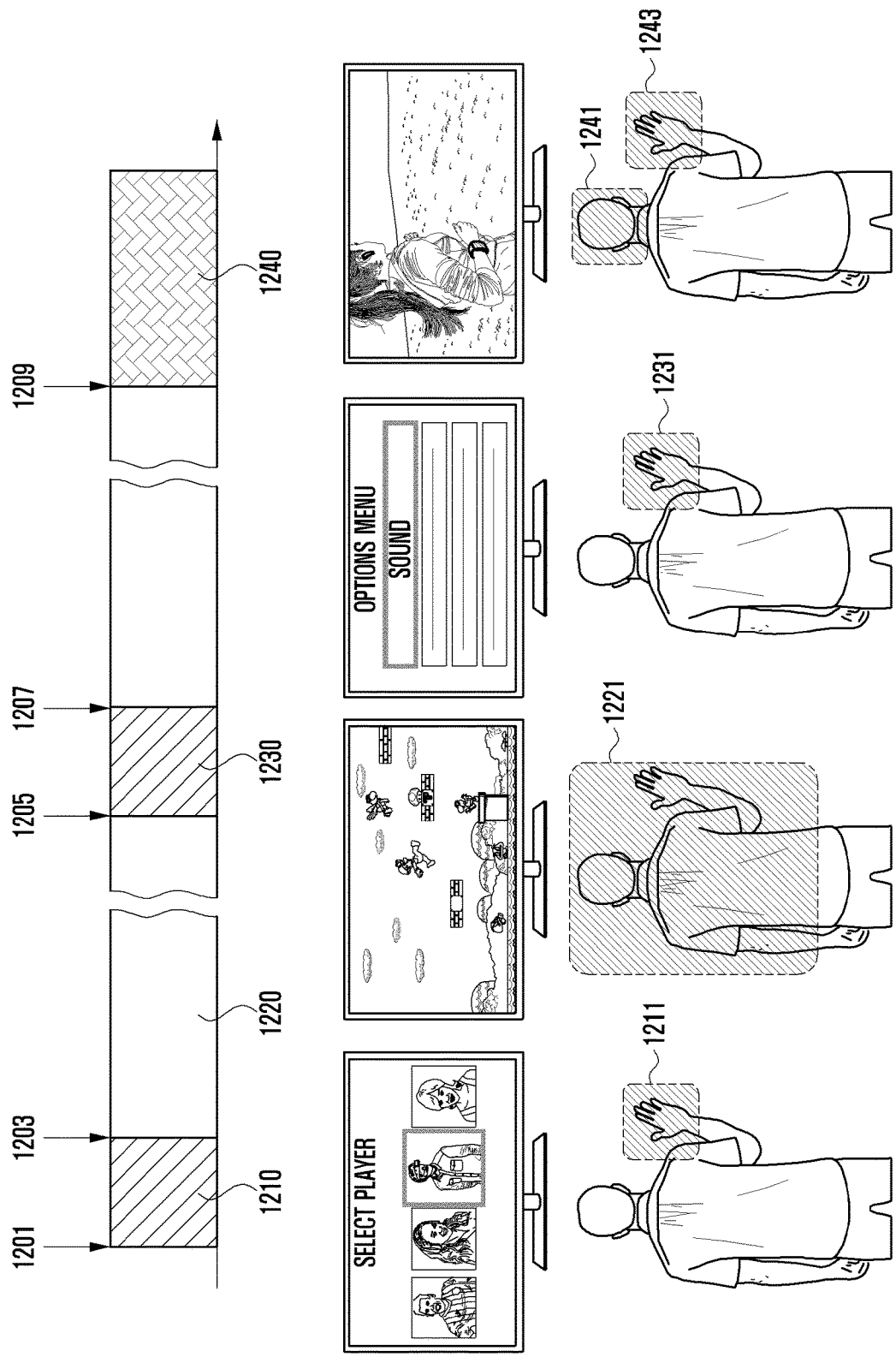
FIG. 12 is a diagram illustrating an operation of controlling an external device through an electronic device according to various embodiments of the disclosure.

FIG. 12 is a diagram illustrating an operation of controlling an external device through an electronic device according to various embodiments of the disclosure.

Referring to FIG. 12, the processor may differently determine an area for detecting a gesture according to content provided by an external device 1030. The processor may determine the area for detecting the gesture based on information on content being executed received from the external device 1030. In this case, the area for detecting the gesture may be determined in consideration of the user's physical characteristics. The upper side of FIG. 12 shows a change of a content mode over time and an example of a screen according thereto. The lower side of FIG. 12 displays an area for detecting gestures for each content being executed in the external device 1030.

According to various embodiments, at time 1201, when, for example, game content is executed, the external device 1030 may enter a menu mode. In the case of content such as the menu mode, since it is not complicated and a user input does not need to be input sensitively, the processor may determine an area for detecting a gesture as only an area 1211 around the user's right hand. In this case, the processor may recognize only the movement of the user's right hand as a valid gesture, or may recognize only the movement of the right hand's finger as a valid gesture. For example, the processor may be configured to recognize only a gesture detected at the right side from the user's central axis as a valid gesture, or may recognize only the movement of the right hand detected in an area separated by a predetermined distance or more from the user's central point as a valid gesture.

According to various embodiments, at time 1203, a game may be executed in the external device 1030 to enter a play mode. In the case of the play mode, since more precise and various inputs are required, the processor may determine the entire upper body 1221 of the user as an area in which a gesture is detected. The processor may determine the upper portion of the user's waist as the area in which the gesture is detected by using the user's waist as a central axis.

According to various embodiments, at time 1205, the external device 1030 may enter a setting mode in which user setting is made. In the case of the setting mode, since a precise input is not required as in the menu mode, the processor may determine only an area 1231 around the right hand as the area in which the gesture is detected.

According to various embodiments, at time 1209, for example, the external device 1030 may enter an advertisement mode. It may be determined that the advertisement mode is operated by dividing a corresponding gesture area into a first gesture area 1241 using the user's face as the center and a second gesture area 1243 using the right hand as the center. When a gesture is detected in a first gesture area around the user's face, the processor may recognize the detected gesture as a first gesture (e.g., a request to provide an additional function), and when a gesture is detected in a second gesture area around the user's right hand, the processor may recognize the detected gesture as a second gesture (e.g., a channel change request).

Figure 13A:
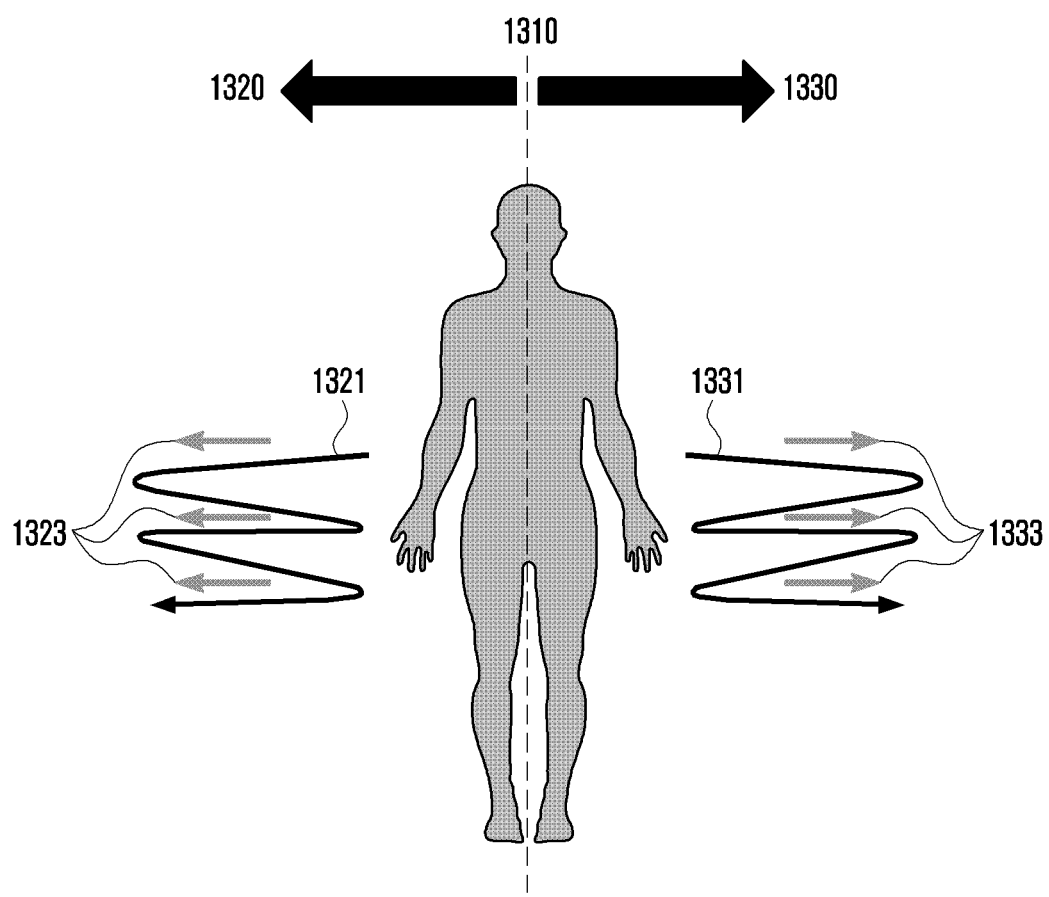
FIGS. 13A and 13B are diagrams illustrating a method of distinguishing a gesture by an electronic device according to various embodiments of the disclosure.
Figure 13B:
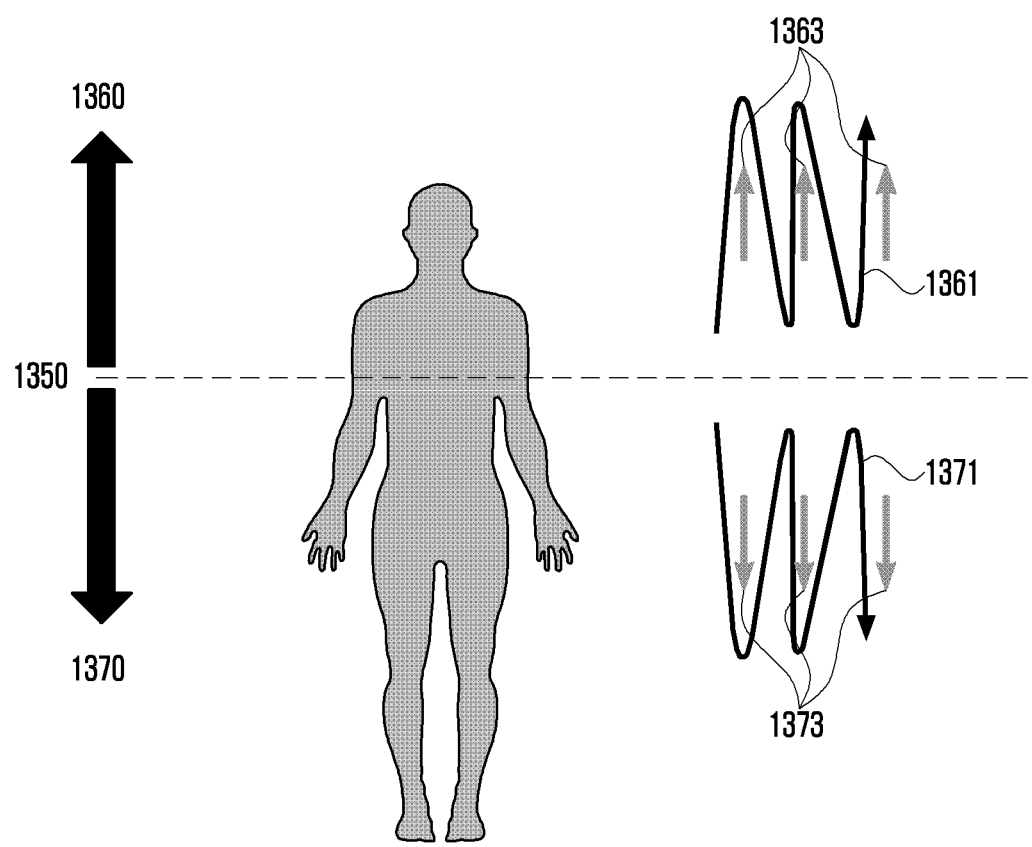

FIGS. 13A and 13B are diagrams illustrating a method of recognizing a gesture by an electronic device according to various embodiments of the disclosure.

Referring to FIG. 13A, the processor may configure a reference axis 1310 based on the user's location. The processor may detect a gesture using at least one sensor and may check a direction of the gesture with respect to the reference axis 1310. The processor may determine whether the detected gesture is valid based on the area in which the gesture is detected and the direction of the gesture.

According to various embodiments, the processor may determine whether the detected gesture is valid by comparing a direction in which the area where the gesture is detected is located from the reference axis with the direction of the detected gesture.

For example, the user may repeatedly perform a plurality of gestures in the same direction on the left or the right side using his or her hand. In order to prevent the plurality of gestures from being repeatedly recognized, the processor may recognize only a gesture in a specific direction for each gesture detection area as a valid gesture.

Referring to FIG. 13A, the processor may configure the reference axis 1310 based on the user's location. The reference axis 1310 may be, for example, a vertical axis using the user as the center. The processor may configure the gesture area with respect to the reference axis 1310. For example, the processor may determine the corresponding gesture area by dividing the corresponding gesture area into a third area located in a first direction 1320 perpendicular to the reference axis 1310 from the reference axis 1310 and a fourth area located in a second direction 1330 opposite the first direction 1320 from the reference axis 1310.

According to various embodiments, the processor may detect a user gesture 1321 repeated three times in the first direction 1320 and the second direction 1330, in the third area located in the first direction 1320 from the reference axis 1310. The second direction may be a direction opposite the first direction. In order to prevent the gesture in the first direction and the gesture in the second direction from being repeatedly recognized, the processor may recognize only the gesture 1323 detected in the first direction within the third area as a valid gesture.

The processor may detect a user gesture 1333 repeated three times in each of the first direction 1320 and the second direction 1330, in the fourth area located in the second direction 1330 from the reference axis 1310. The processor may recognize only the gesture 1333 detected in the second direction 1330 within the fourth area as a valid gesture.

Referring to FIG. 13B, the processor may configure the reference axis 1350 based on the user's location, and the reference axis 1350 may be, for example, a horizontal axis using the user as the center.

A description that is redundant with FIG. 13A will be omitted. When a plurality of gestures 1361 of which directions are repeated in an area located in the third direction 1360 from the reference axis 1350 are detected, the processor may recognize only the gesture 1363 generated in the third direction 1360 as a valid gesture.

When a repeated gesture 1371 of the user is detected in the area located in the fourth direction 1370 from the reference axis 1350, the processor may recognize only the gesture 1373 generated in the fourth direction 1370 as a valid gesture.

Figure 14:
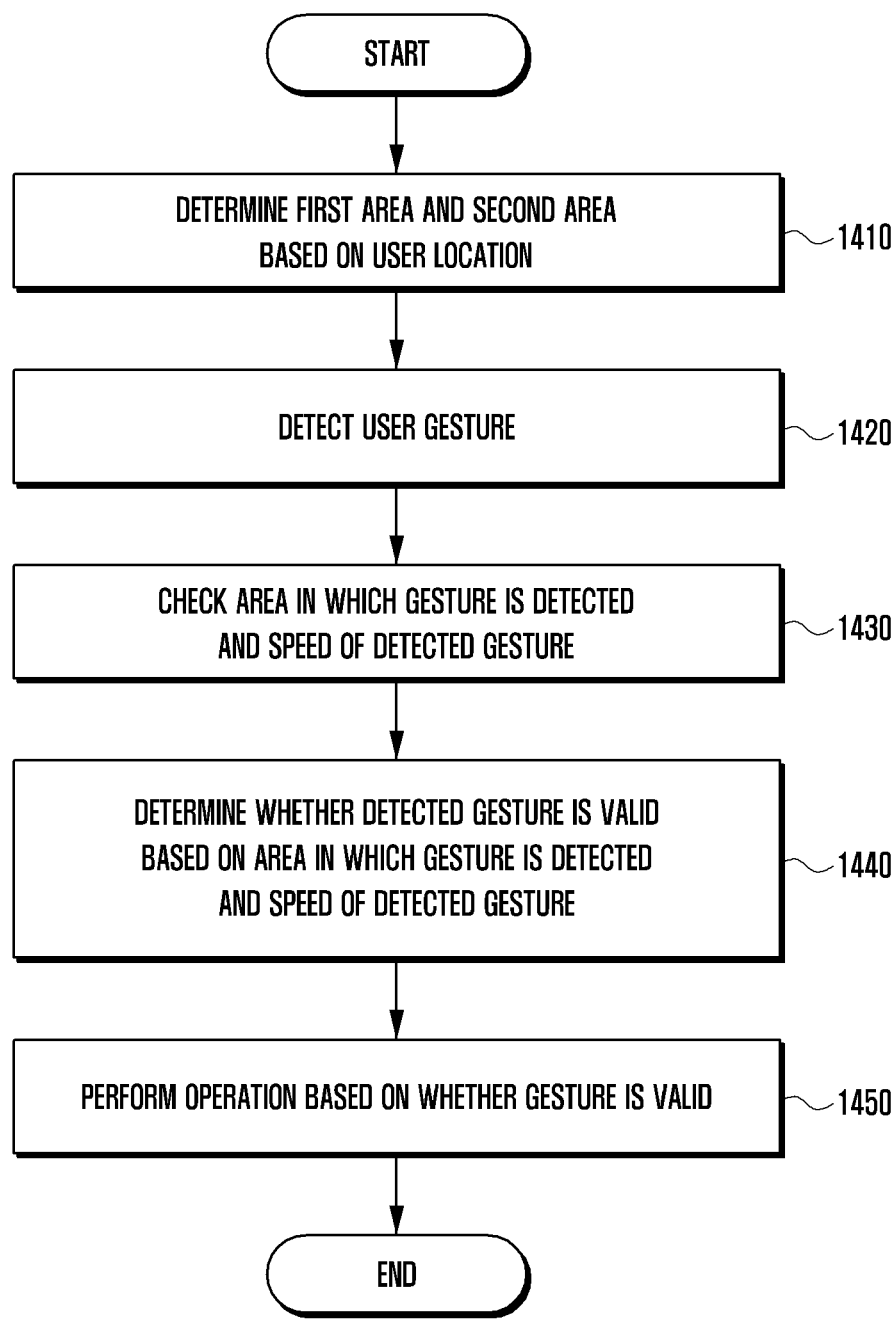
FIG. 14 is an operation flowchart illustrating a method of operating an electronic device according to various embodiments of the disclosure.

FIG. 14 is an operation flowchart illustrating a method of operating an electronic device according to various embodiments of the disclosure.

Referring to FIG. 14, in operation 1410, the processor may determine a first area and a second area based on a user's location. The processor may determine, for example, a first area including a peripheral space within a first distance designated using the user's head as a reference point, and a second area including a peripheral space within a second distance designated larger than the designated first distance and not including the first area.

In operation 1420, the processor may detect a user's gesture using one or more sensors.

In operation 1430, the processor may check an area where a gesture is detected and the speed of the detected gesture.

In operation 1440, the processor may determine whether the detected gesture is valid based on the area where the gesture is detected and the speed of the gesture. The processor may designate a speed for effectively recognizing a gesture detected for each gesture area.

For example, in the first area, when the speed of the gesture is a first speed that exceeds a predetermined threshold value, the corresponding gesture may be recognized as a valid gesture, and when the generation speed of the gesture is a second speed that is equal to or less than a predetermined reference value, the corresponding gesture may be recognized as an invalid gesture.

For example, in the second area, when the speed of the gesture is the second speed that is less than or equal to the predetermined reference value, the corresponding gesture may be recognized as a valid gesture, and when the speed of the gesture is the first speed, the corresponding gesture may be recognized as an invalid gesture. According to various embodiments, in the second area, when the speed of the gesture is the first speed or the second speed, both the gestures may be recognized as valid gestures.

In operation 1450, the processor may perform an operation based on whether the gesture is valid. When the detected gesture is recognized as a valid gesture, the processor may perform an operation corresponding thereto.

Figure 15:
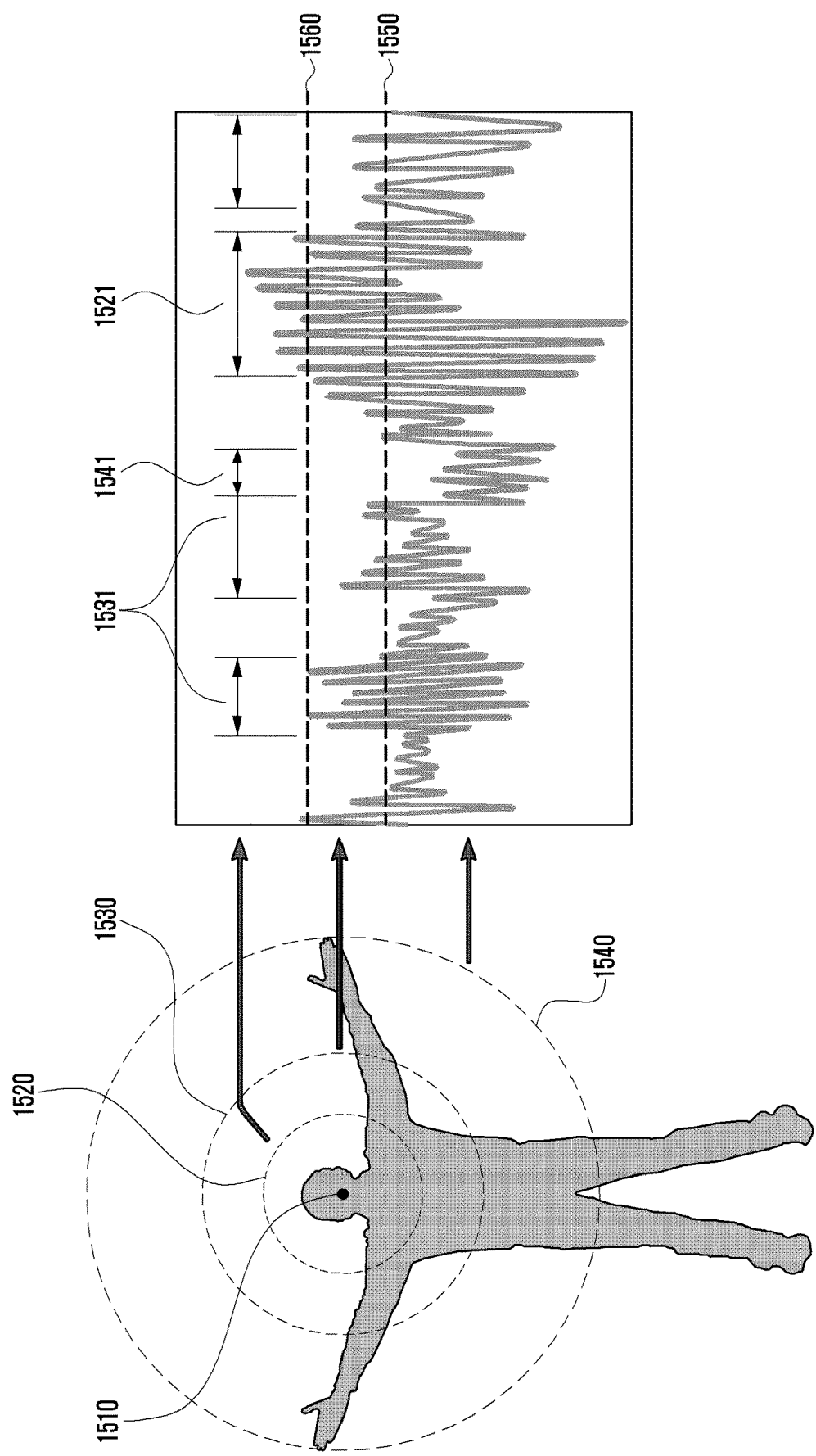
FIG. 15 is a schematic diagram illustrating a method of recognizing a gesture based on a speed of the gesture according to various embodiments of the disclosure.

FIG. 15 is a schematic diagram illustrating a method of recognizing a gesture based on a speed of the gesture according to various embodiments of the disclosure.

Referring to FIG. 15, the processor may determine the validity of a gesture based on an area where the gesture is detected and the gesture speed. Unlike FIG. 14, the gesture area is divided into a first area, a second area, and a third area. A description that is redundant with FIG. 14 will be omitted. The gesture area in FIG. 15 is separate from the first, second, and third areas described above, and only terms are separated to aid understanding of the embodiment. The third area may be determined as an area including a peripheral space within a third distance 1540 designated larger than a designated second distance 1530 and not including the first area and the second area. For example, by configuring the user's head as a reference point, the first area may be designated as a distance 1520 from the head to the shoulder, the second area may be designated as a distance 1530 from the shoulder to the elbow, and the third area may be designated as a distance 1540 from the elbow to the fingertip.

The right graph of FIG. 15 is a graph showing the speed of a gesture over time calculated by tracking a detected gesture. The electronic device may track the speed of the gesture in real time. In the case of a gesture generated in the first area, for example, when the generation speed of the gesture exceeds a second reference value 1560 (a first speed 1521), the corresponding gesture may be recognized as a valid gesture. In this case, when the gesture generation speed is less than or equal to the second reference value 1560, the corresponding gesture may be recognized as an invalid gesture. For example, in the first area, the gesture may be recognized as a valid gesture only when the gesture generation speed exceeds the second reference value 1560.

In the case of a gesture generated in the second area, only when the gesture generation speed exceeds the first reference value 1550 and is less than or equal to the second reference value 1560 (the second speed 1531), the corresponding gesture may be recognized as a valid gesture. When the gesture generation speed exceeds the second reference value 1560 or is less than or equal to the first reference (threshold) value 1550, the corresponding gesture may be recognized as an invalid gesture. For example, in the second area, only when the gesture generation speed exceeds the first reference value 1550 and is less than or equal to the second reference value 1560, the corresponding gesture may be recognized as a valid gesture.

In the case of a gesture generated in the third area, for example, only when the gesture generation speed is less than or equal to the first reference value 1550 (a third speed 1541), the corresponding gesture may be recognized as a valid gesture, and when the gesture generation speed exceeds the first reference value 1550, the corresponding gesture may be recognized as an invalid gesture. For example, in the third area, only when the gesture generation speed is less than or equal to the first reference value 1550, the corresponding gesture may be recognized as a valid gesture.

According to various embodiments, different operations may be performed for each gesture area. For example, when only a gesture with a relatively high speed is recognized in the first area, a zoom in/zoom out operation may be performed in response to recognizing a valid gesture for effective control, and when only a gesture with an intermediate speed is recognized in the second area, a scroll movement operation in units of 5 lines may be performed in response to recognizing a valid gesture for effective control. When only a gesture with a relatively low speed is recognized in the third area, a scroll movement operation in units of pages may be performed in response to recognizing a valid gesture for effective control.

According to various embodiments, variations in input can be provided by recognizing a change in the speed, that is, acceleration for each gesture area. For example, in the case in which a gesture moving away from the reference point is generated, the processor may recognize the corresponding gesture as a valid gesture only when the speed of the gesture increases. For example, when a third speed (less than or equal to the first reference value 1550) is detected in the first area, a second speed (exceeding the first reference value 1550 and less than or equal to the second reference value 1560) is detected in the second area, and a first speed (exceeding the second reference value 1560) is detected in the third area, the speed increases along with an increase in the distance from the reference point, so that the corresponding gesture may be recognized as a valid gesture.

According to various embodiments, an input may be performed based on a difference in the speed of the gesture detected in each area. For example, in the case of scrolling a screen, when a difference between the speed of the gesture detected in the first area and the speed of the gesture detected in the second area is 0.1 m/s, one-page scrolling may be provided, and when the difference is 0.5 m/s, 10-page scrolling may be provided.

Figure 16:
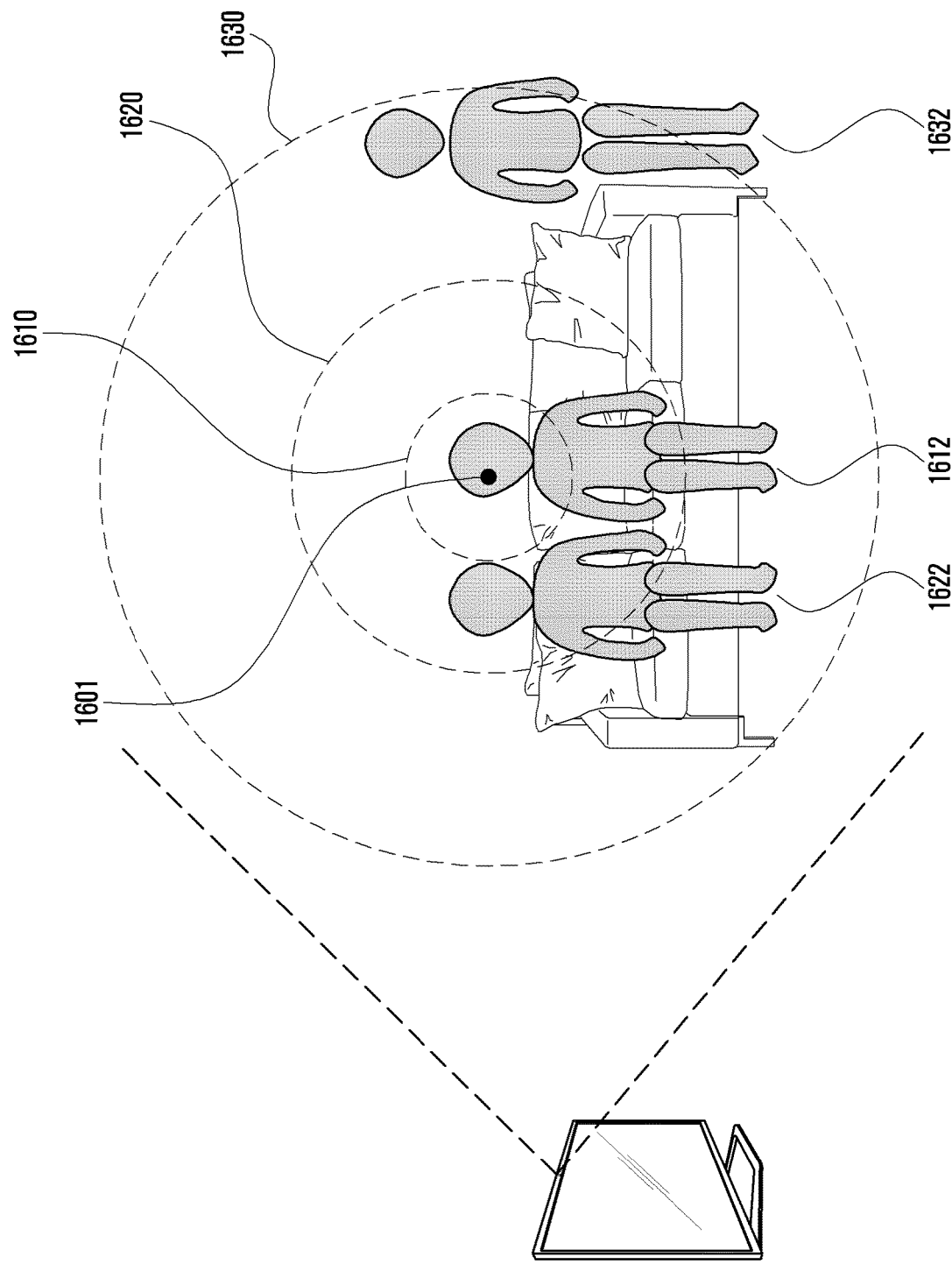
FIG. 16 is a schematic diagram illustrating a case of inputting gestures from a plurality of users according to various embodiments of the disclosure.

FIG. 16 is a schematic diagram illustrating a case of inputting gestures from a plurality of users according to various embodiments of the disclosure.

Referring to FIG. 16, when there are a plurality of users, the processor may determine whether a gesture is valid by assigning a weight based on an area in which each user is located.

According to various embodiments, the processor may determine a gesture area by configuring a reference point 1601 based on, for example, the location of a first user 1612. For example, the processor may determine a fifth area, a sixth area, and a seventh area according to a distance using the head of the first user 1612 as a reference point. According to various embodiments, the processor may divide the gesture area into two areas or three or more areas according to a corresponding distance. Here, the fifth, sixth, and seventh areas are different from the contents described in the other drawings, and are merely divided for clarity in the embodiment. A method of determining the area is the same as described above. For example, when each gesture is detected by a plurality of users, the processor may recognize only gestures having a high priority or may recognize each gesture as a different gesture. The priority may be determined for each area.

According to various embodiments, the processor may determine a first user based on one of a user authentication method, a distance between the electronic device and a plurality of users, and a field of view (FOV) of the electronic device. The processor may perform user authentication through, for example, face recognition. The electronic device may store user's face recognition information in the memory, or may store the plurality of user's face recognition information by configuring the priorities. When the faces of a plurality of users are recognized, the processor may determine a user configured with a priority as high as the first user.

According to various embodiments, the processor may determine the first user based on the distance between the electronic device and the plurality of users. The processor may check respective distances between the electronic device and the plurality of users, and may determine a user closest to the electronic device among the plurality of users as the first user.

According to various embodiments, the processor may determine the first user based on the FOV of the electronic device. A person located at the center of the FOV of the electronic device may be determined as the first user.

According to various embodiments, the processor may determine the gesture area based on the location of an external object (e.g., a sofa) other than the user. The processor may detect, for example, an external object within the FOV of the electronic device and may check the location of the detected external object. The processor may determine the gesture area based on the location of the external object. For example, the processor may determine the fifth area and the sixth area according to the distance using the external object as a reference point. Here, the fifth and sixth areas are different from the contents described in the other drawings, and are merely divided for clarity in the embodiment.

The processor may determine whether the detected gesture is valid, for example, according to an area in which the gesture is detected. The processor may recognize, for example, only a gesture detected in a designated one of the fifth and sixth regions as a valid gesture. For example, the processor may recognize a gesture detected in the fifth area as a valid gesture, and may recognize a gesture detected in the sixth area as an invalid gesture.

According to various embodiments, gestures may be classified and recognized using a plurality of reference objects. For example, the processor may configure an external object (e.g., a sofa) as a first reference object, and may classify gesture areas according to a corresponding distance based on the first reference object. Additionally, the processor may configure, for example, the user's face as a second reference object. In this case, the processor may classify the gestures according to the area in which the second reference object is located regardless of the location where the actual gesture is input.

According to various embodiments, when the face of the first user 1612 is located within the fifth area, the processor may classify a gesture detected by the first user 1612 as a first classification. When the face of a second user 1622 is located within the sixth area, the processor may classify a gesture detected by the second user 1622 as a second classification. When the face of a third user 1632 is located within the seventh area, the processor may classify a gesture detected by the third user 1632 as a third classification.

According to various embodiments, when the gestures are simultaneously detected by a plurality of users, the processor may assign a weight to the gesture detected for each classification, and may preferentially perform the gesture having a high weight. For example, the processor may preferentially perform the gesture detected by the first user in the fifth area than the gesture detected by the second user in the sixth area.

According to various embodiments, when gestures are simultaneously detected by a plurality of users, the processor may recognize a plurality of gestures input in each area as independent gestures, respectively. A first reference object may be designated in advance through image recognition and depth map, or may be designated by recognizing the corresponding location through electrical communication with the electronic device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
   one or more sensors;
   a memory; and
   a processor, wherein the processor is configured to:
     check a distance between the electronic device and a user using the one or more sensors;
     detect a gesture of the user by operating in a first gesture mode based on the checked distance satisfying a designated range, using the one or more sensors;
     detect a gesture of the user by operating in a second gesture mode based on the checked distance deviating from the designated range;
     determine, based on a location related to the user, a first area within a first distance from the location and a second area within a second distance larger than the first distance from the location and not including the first area;
     modify the first area and the second area by performing a machine learning on pattern of gestures that the user performs;
     detect an external object within a designated distance from an area in which a gesture of the external object is detected;
     determine, based on a location of the external object, a third area of the external object including a peripheral space within a third distance of the external object from the location of the external object and a fourth area of the external object including a peripheral space within a fourth distance of the external object larger than the third distance of the external object from the location of the external object and not including the third area of the external object;
     determine a gesture of the user detected in the second area or a gesture of the external object detected in the fourth area as a valid gesture; and
     perform an operation corresponding to the valid gesture based on the gesture being determined as the valid gesture.

2. The electronic device of claim 1, wherein the processor is configured to adjust the determined second area based on a state of the user.

3. The electronic device of claim 1, wherein the processor is configured to:
   receive a user input checking an intention of the user in response to detecting the gesture of the user, and
   change the first area and the second area based on the received user input.

4. The electronic device of claim 1, further comprising:
   a communication circuit,
   wherein the processor is configured, as a part of the detecting the gesture of the user by operating in the second gesture mode, to:
     transmit a signal for communication connection with an external device to the external device through the communication circuit when a gesture of the user controlling the external device is recognized,
     receive information on content being executed from the external device, and
     determine an area in which the gesture of the user is detected based on the received information on the content.

5. The electronic device of claim 4, wherein the area in which the gesture of the user is detected is determined in consideration of physical characteristics of the user.

6. The electronic device of claim 1, wherein the processor is configured, as a part of the detecting the gesture of the user by operating in the second gesture mode, to:
   configure a reference axis based on a location related to the user,
   determine a fifth area located in a first direction perpendicular to the reference axis from the reference axis and a sixth area located in a second direction opposite the first direction from the reference axis, and
   recognize only a gesture in the first direction among gestures detected in the fifth area as the valid gesture, and recognize only a gesture in the second direction among gestures detected in the sixth area as the valid gesture.

7. The electronic device of claim 1, wherein the processor is configured to:
   determine the first area and the second area, and then recognize a gesture detected in the first area as the valid gesture when speed of the gesture of the user exceeds a predetermined reference value, and
   recognize a gesture detected in the second area as a valid gesture when the speed of the gesture of the user is less than or equal to the predetermined reference value.

8. The electronic device of claim 1, wherein the processor is configured to:
   configure a reference point based on the location of the user, and
   determine whether the detected gesture of the user is valid based on an area in which the reference point is located.

9. A method of operating an electronic device, comprising:
   checking a distance between the electronic device and a user using one or more sensors;
   detecting a gesture of the user by operating in a first gesture mode based on the checked distance satisfying a designated range using the one or more sensors;
   detecting a gesture of the user by operating in a second gesture mode based on the checked distance deviating from the designated range;
   determining, based on a location related to the user, a first area within a first distance from the location and a second area within a second distance larger than the first distance from the location and not including the first area;
   modifying the first area and the second area by performing a machine learning on pattern of gestures that the user performs;
   detecting an external object within a designated distance from an area in which a gesture of external object is detected;

determining, based on a location of the external object, a third area of the external object including a peripheral space within a third distance of the external object from the location of the external object and a fourth area of the external object including a peripheral space within a fourth distance of the external object larger than the third distance of the external object from the location of the external object and not including the third area of the external object;

determining a gesture of the user of the detected in the second area or a gesture of the external object detected in the fourth area as a valid gesture; and performing an operation corresponding to the valid gesture based on the gesture being determined as the valid gesture.

10. The method of claim 9, wherein the determined second area can be adjusted based on a state of the user.

11. The method of claim 9, further comprising:
receiving a user input checking an intention of the user in response to detecting the gesture of the user; and
changing the first area and the second area based on the received user input.

12. The method of claim 9, wherein the detecting the gesture by operating in the second gesture mode includes:
transmitting a signal for communication connection with an external device to the external device through a communication circuit when a gesture of the user controlling the external device is recognized,
receiving information on content being executed from the external device, and
determining an area in which the gesture of the user is detected based on the received information on the content.

* * * * *